(12) United States Patent
Kang et al.

(10) Patent No.: US 12,513,773 B2
(45) Date of Patent: Dec. 30, 2025

(54) METHOD AND APPARATUS FOR SUPPORTING SIDELINK DRX IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 17/760,287

(22) PCT Filed: Feb. 5, 2021

(86) PCT No.: PCT/KR2021/001549
§ 371 (c)(1),
(2) Date: Aug. 5, 2022

(87) PCT Pub. No.: WO2021/158060
PCT Pub. Date: Aug. 12, 2021

(65) Prior Publication Data
US 2023/0107246 A1    Apr. 6, 2023

(30) Foreign Application Priority Data

Feb. 5, 2020   (KR) .......... 10-2020-0013960
Sep. 24, 2020  (KR) .......... 10-2020-0123924

(51) Int. Cl.
*H04W 4/00*   (2018.01)
*H04W 76/28*  (2018.01)
*H04W 92/18*  (2009.01)

(52) U.S. Cl.
CPC ............ *H04W 76/28* (2018.02); *H04W 92/18* (2013.01)

(58) Field of Classification Search
CPC ..... H04W 76/28; H04W 92/18; H04W 52/02; Y02D 30/70
USPC ................................................. 370/329, 330
See application file for complete search history.

(56) References Cited

U.S. PATENT DOCUMENTS 10,225,858 B2    3/2019  Lee et al.
2016/0360541 A1 12/2016  Kim et al.
2017/0208516 A1  7/2017  Kubota et al.
2020/0314612 A1* 10/2020 Kang ................ H04W 72/20
(Continued)

FOREIGN PATENT DOCUMENTS

KR  10-2017-0108987 A   9/2017
WO     2018064477 A1    4/2018

OTHER PUBLICATIONS

International Search Report and Written Opinion of the International Searching Authority dated May 21, 2021, in connection with International Application No. PCT/KR2021/001549, 15 pages.
(Continued)

*Primary Examiner* — Chuong T Ho

(57) ABSTRACT

A method of performing, by a terminal, sidelink (SL) discontinuous reception (DRX) may include obtaining SL DRX configuration information, monitoring SL data availability signaling, which is a signal indicating whether SL data is available, based on the SL DRX configuration information; and receiving, from another terminal, data on a resource or resource pool used for SL, based on the SL data availability signaling.

12 Claims, 32 Drawing Sheets

(56) References Cited

U.S. PATENT DOCUMENTS

| | | | |
|---|---|---|---|
| 2021/0059005 A1* | 2/2021 | Hosseini | H04W 76/11 |
| 2021/0176013 A1* | 6/2021 | Ali | H04L 1/1877 |
| 2021/0227620 A1* | 7/2021 | Pan | H04W 4/40 |
| 2021/0227621 A1* | 7/2021 | Pan | H04W 72/02 |
| 2022/0022228 A1* | 1/2022 | Wang | H04W 88/085 |
| 2022/0132603 A1* | 4/2022 | Adjakple | H04W 76/14 |
| 2022/0191793 A1* | 6/2022 | Murray | H04W 52/0232 |
| 2023/0014303 A1* | 1/2023 | Di Girolamo | H04W 72/20 |
| 2023/0064488 A1* | 3/2023 | Han | H04W 76/28 |
| 2023/0066448 A1* | 3/2023 | Tseng | H04W 74/0808 |
| 2023/0337140 A1* | 10/2023 | Miao | H04L 5/0053 |
| 2024/0389115 A1* | 11/2024 | Park | H04W 28/0278 |

OTHER PUBLICATIONS

CATT, "Offline Discussion Summary of PDCCH-based Power," R1-1911558, 3GPP TSG RAN WG1 Meeting #98bis, Chongqing, China, Oct. 14-20, 2019, 39 pages.

Sony, "Discussion on sidelink resource allocation and configuration," R1-1712982, 3GPP TSG RAN WG1 Meeting #90, Prague, Czechia, Aug. 21-25, 2017, 4 pages.

\* cited by examiner

METHOD AND APPARATUS FOR SUPPORTING SIDELINK DRX IN WIRELESS COMMUNICATION SYSTEM

CROSS-REFERENCE TO RELATED APPLICATIONS

This application is a 371 National Stage of International Application No. PCT/KR2021/001549, filed Feb. 5, 2021, which claims priority to Korean Patent Application No. 10-2020-0013960, filed Feb. 5, 2020, and Korean Patent Application No. 10-2020-0123924, filed Sep. 24, 2020, the disclosures of which are herein incorporated by reference in their entirety.

BACKGROUND

1. Field

The disclosure relates to a wireless communication system, and more particularly, to a method and apparatus for supporting discontinuous reception (DRX) by a terminal that performs data transmission and reception based on sidelink in a wireless communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. For this reason, the 5G or pre-5G communication system is also called a beyond 4G network communication system or post long term evolution (LTE) system.

Implementation of the 5G communication system using ultra-high frequency (millimeter wave (mmWave)) bands, e.g., 60 giga hertz (GHz) bands, is being considered to attain higher data transfer rates. To reduce propagation loss of radio waves and increase a transmission range of radio waves in the ultra-high frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM) method, e.g., hybrid FSK and QAM modulation (FQAM), sliding window superposition coding (SWSC), and advanced access technology, e.g., filter bank multi carrier (FBMC), non-orthogonal multiple access (NOMA), and sparse code multiple access (SCMA) are being developed.

The Internet has evolved from a human-centered connection network, through which humans generate and consume information, to an Internet of Things (IoT) network that exchanges and processes information between distributed elements such as objects. An Internet of everything (IoE) technology in which a big data processing technology via a connection with a cloud server or the like is combined with the IoT technology has emerged. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet (or, information) technology (IT) services may be provided to collect and analyze data obtained from objects connected to each other to create new value in human life. The IoT may be applied to fields such as smart homes, smart buildings, smart cities, smart cars or connected cars, smart grids, health care, smart home appliances, and advanced medical services through convergence and integration of existing IT and various industries.

In this regard, various attempts to apply the 5G communication system to the IoT network are being made. For example, technologies such as sensor network, M2M communication, and MTC are implemented by 5G communication technologies, such as beamforming, MIMO, and array antenna. The application of a cloud RAN as big data processing technology may also be considered as an example of convergence between 5G technology and IoT technology.

In addition, research into terminal direct communication (sidelink communication) using the 5G communication system has been conducted, and the sidelink communication may be applied to, for example, vehicle-to-everything (hereinafter, referred to as "V2X"), and is expected to be able to provide various services to users.

With the advancement of the aforementioned wireless communication system, various services may be provided, and in particular, a method for supporting a sidelink discontinuous reception (DRX) procedure is demanded.

SUMMARY

The disclosure provides a method and apparatus for processing a discontinuous reception (DRX) procedure of a terminal that performs data transmission and reception based on sidelink in a wireless communication system.

According to disclosed embodiments, provided are an apparatus and method for effectively providing a service in a mobile communication system.

DETAILED DESCRIPTION

Figure 1:
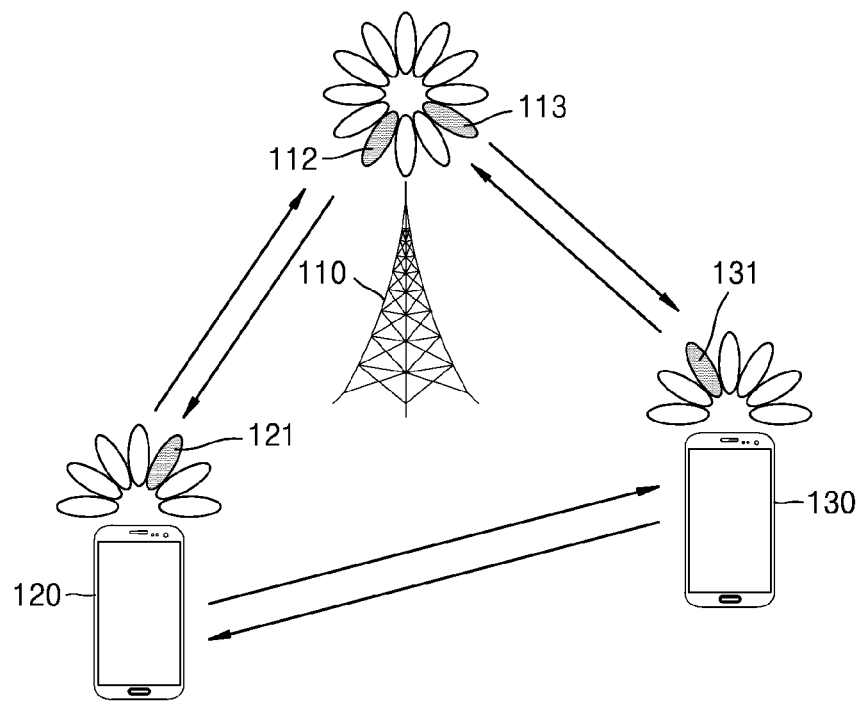
FIG. 1 illustrates a wireless communication system according to an embodiment of the disclosure.

According to an aspect of the disclosure, a method of performing, by a terminal, sidelink (SL) discontinuous reception (DRX) includes obtaining SL DRX configuration information, monitoring SL data availability signaling, which is a signal indicating whether SL data is available, based on the SL DRX configuration information, and receiving, from another terminal, data on a resource or resource pool used for SL, based on the SL data availability signaling.

In an according to an embodiment of the disclosure, the method may further include transmitting SL DRX assistance information to a base station (BS), and the obtaining of the SL DRX configuration information may include receiving, from the BS, SL DRX configuration information generated based on the SL DRX assistance information.

In an according to an embodiment of the disclosure, the SL DRX configuration information may include configured grant resource configuration information for SL transmission, and the monitoring of the SL data availability signaling based on the SL DRX configuration information may include determining a DRX cycle and an on-duration based on at least one of a resource or resource pool used for the SL, a SL service in which the terminal is interested, or the configured grant resource configuration information, and monitoring the SL data availability signaling based on the determined DRX cycle and the determined on-duration.

In an according to an embodiment of the disclosure, the method may further include entering a DRX sleep period based on a timer or no more data availability signaling.

In an according to an embodiment of the disclosure, the DRX configuration information may be mapped to at least one of a SL quality of service (QoS) parameter, a SL PC5 QoS identifier (PQI), a SL cast type, a resource pool used for the SL, a resource reservation period, or configured grant resource configuration information for SL transmission.

In an according to an embodiment of the disclosure, the resource pool may include a SL transmission resource pool and a SL reception resource pool, and the SL transmission resource pool may be aligned with the SL reception resource pool, so that the SL transmission and reception resource pools are mapped with same SL DRX configuration information.

According to another aspect of the disclosure, a method of performing, by a terminal sidelink (SL) discontinuous reception (DRX) includes obtaining SL DRX configuration information, and transmitting, to another terminal, SL data availability signaling and data corresponding to the SL data availability signaling based on the SL DRX configuration information, the SL data availability signaling indicating whether SL data is available in a resource or resource pool used for SL.

According to another aspect of the disclosure, a terminal performing sidelink (SL) discontinuous reception (DRX) includes a communicator, and at least one processor configured to obtain SL DRX configuration information, to monitor SL data availability signaling, which is a signal indicating whether SL data is available, based on the SL DRX configuration information, and to receive, from another terminal, data on a resource or resource pool used for SL, based on the SL data availability signaling.

In an according to an embodiment of the disclosure, at least one processor may be further configured to transmit SL DRX assistance information to a base station (BS), and the obtaining of the SL DRX configuration information may include receiving, from the BS, SL DRX configuration information generated based on the SL DRX assistance information.

In an according to an embodiment of the disclosure, the SL DRX configuration information may include configured grant resource configuration information for SL transmission, and the monitoring of the SL data availability signaling based on the SL DRX configuration information may include determining a DRX cycle and an on-duration based on at least one of a resource or resource pool used for the SL, a SL service in which the terminal is interested, or the configured grant resource configuration information, and monitoring the SL data availability signaling based on the determined DRX cycle and the determined on-duration.

In an according to an embodiment of the disclosure, the at least one processor may be further configured to enter a DRX sleep period based on a timer or no more data availability signaling.

In an according to an embodiment of the disclosure, the DRX configuration information may be mapped to at least one of a SL quality of service (QoS) parameter, a SL PC5 QoS identifier (PQI), a SL cast type, a resource pool used for the SL, a resource reservation period, or configured grant resource configuration information for SL transmission.

In an according to an embodiment of the disclosure, the resource pool may include a SL transmission resource pool and a SL reception resource pool, and the SL transmission resource pool may be aligned with the SL reception resource pool, so that the SL transmission and reception resource pools are mapped with same SL DRX configuration information.

According to another aspect of the disclosure, a terminal performing sidelink (SL) discontinuous reception (DRX) includes a transceiver, and at least one processor configured to obtain SL DRX configuration information, and to transmit, to another terminal, SL data availability signaling and data corresponding to the SL data availability signaling based on the SL DRX configuration information, the SL data availability signaling indicating whether SL data is available in a resource or resource pool used for SL.

Hereinafter, embodiments of the disclosure will be described in detail with reference to accompanying drawings. In the accompanying drawings, it will be understood that like reference numerals denote like elements. Also, detailed descriptions of well-known functions and configurations in the art are omitted when it is deemed that they may unnecessarily obscure the essence of the disclosure.

In the following descriptions of embodiments in the specification, descriptions of techniques that are well known in the art and are not directly related to the disclosure are omitted. This is to clearly convey the gist of the disclosure by omitting an unnecessary explanation.

For the same reasons, elements may be exaggerated, omitted, or schematically illustrated in drawings for clarity. Also, the size of each of the elements does not entirely reflect the actual size. In each drawing, elements that are the same or are in correspondence are rendered the same reference numeral.

Advantages and features of the disclosure and methods of accomplishing the same may be understood more readily by reference to the following detailed description of the embodiments of the disclosure and the accompanying drawings. The disclosure may, however, be embodied in many different forms and should not be construed as being limited to the embodiments set forth herein. Rather, these embodiments are provided so that this disclosure will be thorough and complete, and will fully convey the concept of the disclosure to one of ordinary skill in the art. Therefore, the scope of the disclosure is defined by the appended claims. In the specification, the same elements are denoted by the same reference characters.

Here, it will be understood that combinations of blocks in flowcharts or process flow diagrams may be performed by computer program instructions. Because these computer program instructions may be loaded into a processor of a general-purpose computer, special purpose computer, or other programmable data processing device, the instructions, which are executed via the processor of the computer or other programmable data processing device generate means for implementing functions specified in the flowchart block(s). Because these computer program instructions may also be stored in a computer usable or computer-readable memory that may direct a computer or other programmable data processing device to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing device, a series of operational steps may be performed on the computer or other programmable device to produce a computer implemented process, and thus, the instructions executed on the computer or other programmable device may provide steps for implementing the functions specified in the flowchart block(s).

In addition, each block of the flowchart illustrations may represent a module, segment, or portion of code, which include one or more executable instructions for performing specified logical function(s). It should also be noted that in some alternative implementations, the functions noted in the blocks may occur out of the order. For example, two blocks illustrated successively may actually be executed substantially concurrently, or the blocks may sometimes be performed in a reverse order according to the corresponding function.

Here, the term "-er/or" used in the embodiments means a software component or hardware component, such as a field-programmable gate array (FPGA) or an application-specific integrated circuit (ASIC), and performs a specific function. However, the term "-er/or" is not limited to software or hardware. The term "-er/or" may be configured in an addressable storage medium or may be configured to reproduce one or more processors. Thus, for example, the term "-er/or" may refer to elements such as software elements, object-oriented software elements, class elements, and task elements, and may include processes, functions, attributes, procedures, subroutines, segments of program code, drivers, firmware, micro codes, circuits, data, a database, data structures, tables, arrays, or variables. The functionality provided in elements and "-er/or" may be combined into fewer elements and "-er/or" or may be further separated into additional elements and "-er/or". Further, the elements and "-er/or" may be implemented to operate one or more central processing units (CPUs) in a device or a secure multimedia card.

When particularly describing embodiments of the disclosure, a New RAN (NR) that is a radio access network and a packet core (5G System, 5G Core Network, or NG Core: Next Generation Core) that is a core network in 5G mobile communication standards defined by 3GPP that is a mobile communication standard organizing group are main targets, but the essential concept of the disclosure may be modified without departing from the scope of the disclosure and may be applied to other communication system based on similar technical backgrounds, and the application may be made based on determination by one of ordinary skill in the art.

In the 5G system, a network data collection and analysis function (NWDAF) may be defined to support network automation, the NWDAF referring to a network function for providing a function to analyze and provide data collected over a 5G network. The NWDAF may collect/store/analyze information from the 5G network and may provide a result to an unspecified network function (NF), and an analysis result may be independently used by each NF.

For convenience of descriptions, the disclosure uses some of terms and names defined in the 3GPP LTE standards (standards of 5G, NR, LTE, or similar system). However, the disclosure is not limited to these terms and names, and may be equally applied to communication systems conforming to other standards.

Hereinafter, the disclosure relates to a method and apparatus for processing sidelink DRX by a terminal that performs data transmission and reception based on sidelink in a wireless communication system. The disclosure provides a method and apparatus for processing DRX by a terminal performing data transmission and a terminal performing data reception, based on sidelink (SL) unicast, SL groupcast, and SL broadcast in a wireless communication system.

Specifically, the disclosure may include an operation, performed by a terminal configured to receive data via SL, of determining the necessity of SL data reception according to a SL DRX cycle and a DRX on-duration, monitoring SL data when the data reception is necessary, and transitioning to a SL DRX sleep period without monitoring the SL data, when it is determined that the SL data reception is unnecessary. According to embodiments of the disclosure, a terminal may perform a SL DRX operation so that a battery use by the terminal consumed during unnecessary data monitoring may be minimized.

In addition, specifically, according to an embodiment of the disclosure, a method of performing, by a terminal, a SL DRX operation in a wireless communication may include: obtaining, by the terminal, SL DRX cycle information and SL DRX on-duration information; determining the necessity of SL data reception in SL DRX on-duration; receiving SL data when it is determined that the SL data reception is necessary; and transitioning to a SL DRX sleep period when it is determined that the SL data reception is unnecessary.

Hereinafter, terms indicating signals, terms indicating channels, terms indicating control information, terms indicating network entities, terms indicating elements of devices, and the like, as used in the following description, are exemplified for convenience of descriptions. Accordingly, the disclosure is not limited to the terms, and other terms indicating objects having equal technical meanings may be used.

Hereinafter, the term "base station" refers to an entity for allocating resources to a terminal and may be used interchangeably with at least one of a gNode B, an eNode B, a node B, a base station (BS), a radio access unit, a base station controller, or a node over a network. Examples of a terminal may include a user equipment (UE), a mobile station (MS), a cellular phone, a smartphone, a computer, and a multimedia system capable of performing a communication function. However, this is only an example, and the BS and the terminal are not limited to the examples described above. In the disclosure, an evolved node B (eNB) may be interchangeably used with a next-generation node B (gNB) for convenience of descriptions. That is, a BS described by an eNB may represent a gNB. In the disclosure, the term "terminals" may refer to not only mobile phones, narrowband IoT (NB-IoT) devices, and sensors, but also various wireless communication devices.

In the following description, the terms of physical channel and signal may be interchangeably used with data or a control signal. For example, a physical downlink shared channel (PDSCH) is a term referring to a physical channel on which data is transmitted. However, the PDSCH may also be used to refer to data. In other words, in the disclosure, the expression "transmit a physical channel" may be interpreted as being equivalent to the expression "transmit data or a signal on a physical channel".

Hereinafter, in the disclosure, higher layer signaling denotes a signal transfer scheme in which a signal is transferred to a terminal from a BS by using a downlink data channel at a physical layer, or in which a signal is transferred to a BS from a terminal by using an uplink data channel at a physical layer. The higher layer signaling may be understood as radio resource control (RRC) signaling or a media access control (MAC) control element (CE).

In addition, although, in the disclosure, the expressions such as "greater than" or "less than" are used to determine whether a particular condition (or criterion) is satisfied or fulfilled, the expressions are merely to describe an example, and are not intended to exclude descriptions of "greater than or equal to" or "less than or equal to". A condition written with "greater than or equal to" may be replaced with "greater than", a condition with "less than or equal to" may be replaced with "less than", and a condition with "greater than or equal to . . . and less than . . . " may be replaced with "greater than . . . and less than or equal to . . . "

Also, in the disclosure, embodiments will now be described by using terms and names defined in some communication standards (e.g., the 3GPP), but the disclosure is not limited to the terms and names. Embodiments of the disclosure may be easily modified and applied to other communication systems.

FIG. 1 is a diagram of a wireless communication system according to an embodiment of the disclosure.

Referring to FIG. 1, a BS 110, a terminal 120, and a terminal 130 are shown as some of nodes using a wireless channel in a wireless communication system. In FIG. 1, only one BS is shown. However, another BS which is the same as or similar to the BS 110 may be further included.

The BS 110 is a network infrastructure that provides a wireless connection to the terminals 120 and 130. The BS 110 has a coverage which is defined as a certain geographical area based on a distance a signal may be transmitted therefrom. The BS 110 may also be referred to as an access point (AP), eNB, 5G node, gNB, wireless point, transmission/reception point (TRP), or another term having an equivalent technical meaning.

The terminal 120 and the terminal 130, which are devices used by a user, may each perform communication with the BS via a wireless channel. A link facing the terminal 120 or terminal 130 from the BS 110 may be referred to as downlink (DL), and a link facing the BS 110 from the terminal 120 or terminal 130 may be referred to as uplink (UL). In addition, the terminal 120 and the terminal 130 may perform communication with each other via a wireless channel. In this case, a link between the terminal 120 and the terminal 130 may be referred to as SL, and the SL may also be referred to as a PC5 interface. In some cases, at least one of the terminal 120 or the terminal 130 may be operated without user's involvement. In other words, at least one of the terminal 120 or the terminal 130, which are devices that perform MTC, may not be carried by a user. Each of the terminal 120 and the terminal 130 may be referred to as a user equipment (UE), a mobile station, a subscriber station, a remote terminal, a wireless terminal, a user device, or another term having an equivalent technical meaning, in addition to a terminal.

The BS 110, the terminal 120, and the terminal 130 may transmit and receive a wireless signal in a millimeter-wave (mmWave) band (e.g., 28 GHz, 30 GHz, 38 GHz, or 60 GHz). In this regard, in order to increase a channel gain, the BS 110, the terminal 120, and the terminal 130 may perform beamforming. Here, the beamforming may include transmission beamforming and reception beamforming. In other words, the BS 110, the terminal 120, and the terminal 130 may apply directivity to a transmission signal or a reception signal. To this end, the BS 110 and the terminals 120 and 130 may select serving beams 112, 113, 121, and 131 through a beam search procedure or beam management procedure. After the serving beams 112, 113, 121, and 131 are selected, a subsequent communication may be performed by using resources in a quasi-co-located (QCL) relationship with resources on which the serving beams 112, 113, 121, and 131 are transmitted.

When large-scale characteristics of a channel on which a symbol on a first antenna port is transferred may be inferred from a channel on which a symbol on a second antenna port is transferred, it may be evaluated that the first antenna port and the second antenna port are in a QCL relationship. For example, the large-scale characteristics may include at least one of delay spread, Doppler spread, Doppler shift, average gain, average delay, or spatial receiver parameter.

The terminal 120 and the terminal 130 shown in FIG. 1 may support vehicle communication. In a case of vehicle communication, in an LTE system, standardization work for vehicle-to-everything (V2X) technology based on a device-to-device (D2D) communication structure has been completed in 3GPP Release 14 and Release 15, and currently, efforts have been made to develop V2X technology based on 5G NR. NR V2X is to support unicast communication, groupcast (or multicast) communication, and broadcast communication between terminals. In addition, unlike LTE V2X aimed for transmission and reception of basic safety information required for road driving of vehicles, NR V2X is aimed to provide further advanced services, such as platooning, advanced driving, extended sensor, and remote driving.

The V2X service may be divided into a basic safety service and an advanced service. The basic safety service may include detailed services, such as a vehicle notification (cooperative awareness messages (CAM) or basic safety message (BSM) service, a left turn notification service, a front vehicle collision warning service, an emergency vehicle approach notification service, a forward obstacle warning service, and an intersection signal information service, and V2X information may be transmitted and received by using a broadcast, unicast, or groupcast transmission scheme. The advanced service not only has reinforced quality of service (QoS) requirements compared to the basic safety service, but also requires a method of transmitting and receiving V2X information by using unicast and groupcast transmission schemes in addition to the broadcast transmission scheme, so that the V2X information may be transmitted and received within a specific vehicle group or that V2X information may be transmitted and received between two vehicles. The advanced service may include detailed services, such as a platooning service, an autonomous driving service, a remote driving service, and an extended sensor-based V2X service.

Hereinafter, SL refers to a transmission or reception path for a signal between terminals and may be interchangeably used with a PC5 interface. Hereinafter, a BS, which is an entity performing a resource allocation on a terminal, may be a BS that supports both V2X communication and normal cellular communication, or may be a BS that supports only V2X communication. In other words, the BS may refer to an NR BS (e.g., gNB), an LTE BS (e.g., eNB), or a road site unit (RSU). A terminal may include all of a vehicle supporting a vehicular-to-vehicular (V2V) communication, a vehicle or a handset of pedestrian (e.g., a smartphone) that support a vehicular-to-pedestrian (V2P) communication, a vehicle supporting a vehicular-to-network (V2N) between a vehicle and a network, a vehicle supporting a vehicular-to-infrastructure (V2I) communication, an RSU equipped with a terminal function, an RSU equipped with a BS function, or an RSU equipped with some BS function and some terminal function, in addition to a general UE and a mobile station. In addition, the term "V2X terminal" used in the following description may also be referred to as a "terminal". In other words, in association with V2X communication, the terminal may be used as a V2X terminal.

The BS and the terminal may be connected to each other via a Uu interface. UL denotes a wireless link via which the terminal transmits data or a control signal to the BS, and DL denotes a wireless link via which the BS transmits data or a control signal to the terminal.

Figure 2:
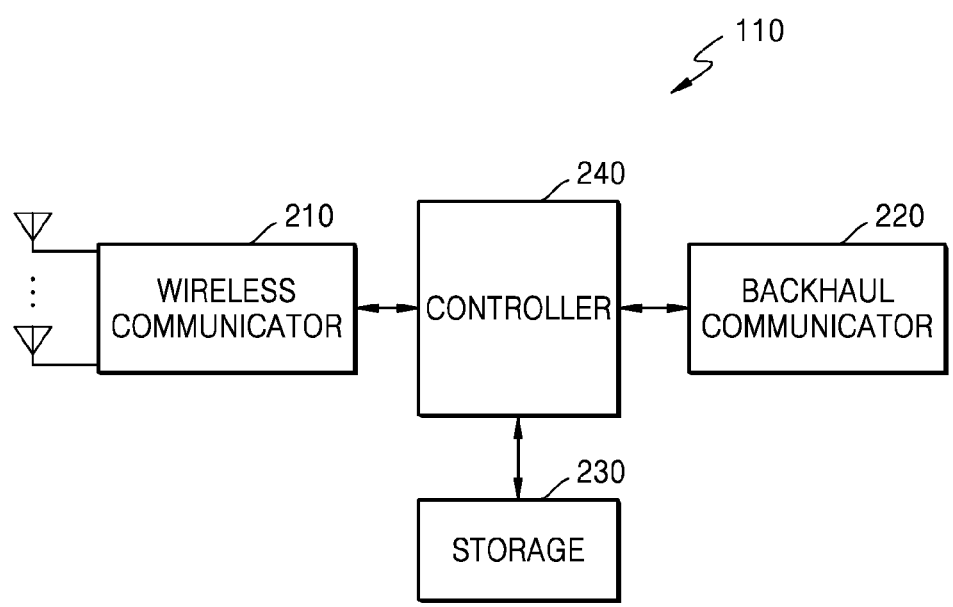
FIG. 2 illustrates a configuration of a base station in a wireless communication system according to an embodiment of the disclosure.

FIG. 2 is a block diagram of a configuration of a BS in a wireless communication system according to an embodiment of the disclosure. The configuration shown in FIG. 2 may be understood as a configuration of a BS 110. The terms such as "-er/or", "unit", and the like used in the disclosure indicate a unit for processing at least one function or motion and may be implemented by hardware or software, or a combination of hardware and software.

Referring to FIG. 2, the BS 110 may include a wireless communicator 210, a backhaul communicator 220, a storage 230, and a controller 240. However, elements of the BS 110 are not limited to the above-described example. For example, the BS may include more or fewer elements than those described above. In addition, the wireless communicator 210, the backhaul communicator 220, the storage 230, and the controller 240 may be implemented in a single-chip form. In addition, the controller 240 may include one or more processors.

The wireless communicator 210 may perform functions for transmitting and receiving a signal via a wireless channel. For example, the wireless communicator 210 may perform a conversion function between a baseband signal and a bit string based on a physical layer standard of a system. For example, for data transmission, the wireless communicator 210 may generate complex symbols by encoding and modulating a transmission bit string. For data reception, the wireless communicator 210 may reconstruct a reception bit string by demodulating and decoding a baseband signal.

In addition, the wireless communicator 210 up-converts the baseband signal into a radio frequency (RF) band signal and then transmits the RF band signal via an antenna, and down-converts the RF band signal received via the antenna, into a baseband signal. In this regard, the wireless communicator 210 may include a transmit filter, a receive filter, an amplifier, a mixer, an oscillator, a digital-to-analog converter (DAC), an analog-to-digital converter (ADC), etc. In addition, the wireless communicator 210 may include a plurality of transmission and reception paths. Furthermore, the wireless communicator 210 may include at least one antenna array including a plurality of antenna elements.

In terms of hardware, the wireless communicator 210 may be configured as a digital unit and an analog unit, and the analog unit may be configured as a plurality of sub-units, depending on an operating power, an operating frequency, or the like. The digital unit may be configured as at least one processor (e.g., a digital signal processor (DSP)).

The wireless communicator 210 may transmit and receive signals, as described above. Accordingly, all parts or some parts of the wireless communicator 210 may be referred to as a transmitter, a receiver, or a transceiver. In the description below, transmission and reception performed via the wireless channel may be used in the meaning that the process described above is performed by the wireless communicator 210.

The backhaul communicator 220 may provide an interface for communicating with other nodes within a network. In other words, the backhaul communicator 220 may convert a bit string transmitted from the BS 110 to another node, for example, another access node, another BS, a higher node, or a core network, into a physical signal, and may convert a physical signal received from another node into a bit string.

The storage 230 may store data for operations of the BS 110, such as basic programs, application programs, and configuration information. The storage 230 may be configured as a volatile memory, a non-volatile memory, or a combination of a volatile memory and a non-volatile memory. In addition, the storage 230 may provide data stored therein at a request of the controller 240.

The controller 240 may control overall operations of the BS 110. For example, the controller 240 may transmit and receive a signal via the wireless communicator 210 or the backhaul communicator 220. In addition, the controller 240 records and reads data to and from the storage 230. In addition, the controller 240 may perform functions of a protocol stack required in a communication standard. According to another embodiment of the disclosure, the protocol stack may be included in the wireless communicator 210. In this regard, the controller 240 may include at least one processor. According to embodiments of the disclosure, the controller 240 may perform control such that the BS 110 performs operations according to embodiments to be described later.

Figure 3:
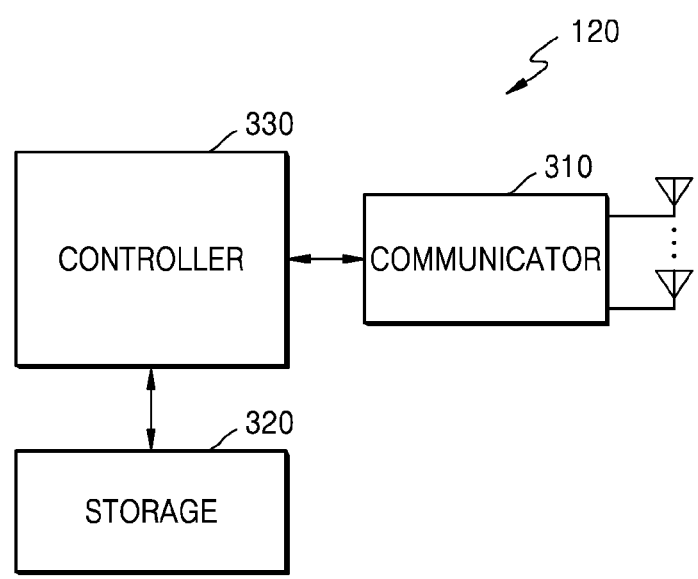
FIG. 3 illustrates a configuration of a terminal in a wireless communication system according to an embodiment of the disclosure.

FIG. 3 illustrates a configuration of a terminal in a wireless communication system according to an embodiment of the disclosure.

The configuration shown in FIG. 3 may be understood as a configuration of the terminal 120. The terms such as "-er/or", "module", and the like used in the disclosure indicate a unit for processing at least one function or motion and may be implemented by hardware or software, or a combination of hardware and software.

Referring to FIG. 3, the terminal 120 may include a communicator 310, a storage 320, and a controller 330. However, elements of the terminal 120 are not limited to the example described above. For example, the terminal 120 may include more or fewer elements than those described above. In addition, the communicator 310, the storage 320, and the controller 330 may be implemented in a single-chip form. In addition, the controller 330 may include one or more processors.

The communicator 310 performs functions for transmitting and receiving a signal via a wireless channel. For example, the communicator 310 may perform conversion between a baseband signal and a bit string based on a physical layer standard of a system. For example, for data transmission, the communicator 310 generates complex symbols by encoding and modulating a transmission bit string. For data reception, the communicator 310 may reconstruct a reception bit string by demodulating and decoding a baseband signal. Furthermore, the communicator 310 may up-convert the baseband signal to an RF band signal and then transmit the RF band signal via an antenna, and may down-convert an RF band signal received via the antenna to a baseband signal. For example, the communicator 310 may include a transmit filter, a receive filter, an amplifier, a mixer, an oscillator, a DAC, an ADC, or the like.

In addition, the communicator 310 may include a plurality of transmission and reception paths. Furthermore, the communicator 310 may include at least one antenna array including a plurality of antenna elements. In terms of hardware, the communicator 310 may be configured as a digital circuit and an analog circuit (e.g., a radio frequency integrated circuit (RFIC)). In this regard, the digital circuit and the analog circuit may be implemented as one package. In addition, the communicator 310 may include a plurality of RF chains. In addition, the communicator 310 may perform beamforming.

The communicator 310 may transmit and receive signals, as described above. Accordingly, all parts or some parts of the communicator 310 may be referred to as a transmitter, a receiver, or a transceiver. In the description below, transmission and reception performed via the wireless channel may be used in the meaning that the process described above is performed by the communicator 310.

The storage 320 may store data for operations of the terminal 120, such as basic programs, application programs, or configuration information. The storage 320 may be configured as a volatile memory, a non-volatile memory, or a combination of a volatile memory and a non-volatile memory. In addition, the storage 320 provides data stored therein at a request by the controller 330.

The controller 330 controls overall operations of the terminal 120. For example, the controller 330 may transmit and receive signals via the communicator 310. In addition, the controller 330 records and reads data to and from the storage 320. In addition, the controller 330 may perform functions of a protocol stack required in a communication standard. In this regard, the controller 330 may include at least one processor or microprocessor or may be part of a processor. In addition, part of the communicator 310 and the controller 330 may be referred to as a communication processor (CP). According to embodiments of the disclosure, the controller 330 may perform control such that the terminal 120 performs operations according to embodiments to be described later.

Figure 4:
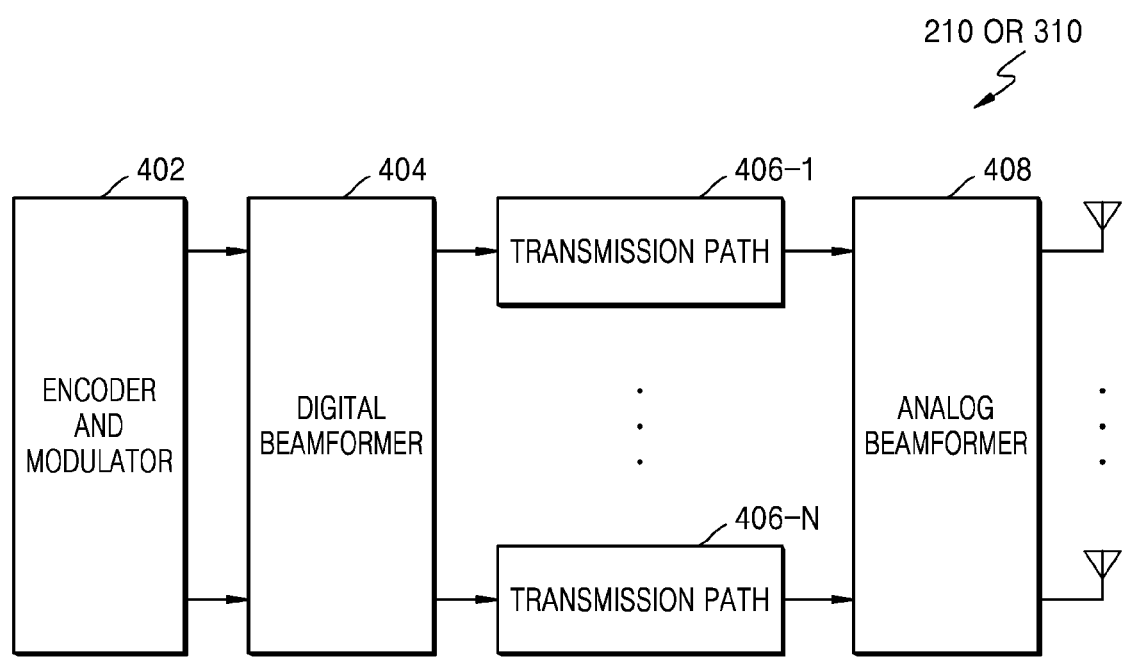
FIG. 4 illustrates a configuration of a communicator in a wireless communication system according to an embodiment of the disclosure.

FIG. 4 illustrates a configuration of a communicator in a wireless communication system according to an embodiment of the disclosure.

FIG. 4 illustrates an example of a detailed configuration of the wireless communicator 210 of FIG. 2 or the communicator 310 of FIG. 3. Specifically, FIG. 4 illustrates elements for performing beamforming, as part of the wireless communicator 210 of FIG. 2 or as part of the communicator 310 of FIG. 3.

Referring to FIG. 4, the wireless communicator 210 or the communicator 310 may include an encoder and modulator 402, a digital beamformer 404, a plurality of transmission paths 406-1 to 406-N, and an analog beamformer 408.

The encoder and modulator 402 may perform channel encoding. For the channel encoding, at least one of a low density parity check (LDPC) code, a convolution code, or a polar code may be used. The encoder and modulator 402 generates modulation symbols by performing constellation mapping.

The digital beamformer 404 may perform beamforming on a digital signal (e.g., the modulation symbols). In this regard, the digital beamformer 404 multiples the modulation symbols by beamforming weights. In this regard, the beamforming weights are used to change the magnitude and phase of a signal, and may be referred to as a precoding matrix, a precoder, etc. The digital beamformer 404 may output the digitally beamformed modulation symbols to the plurality of transmission paths 406-1 to 406-N. Here, according to a multiple input multiple output (MIMO) transmission technique, the modulation symbols may be multiplexed or the same modulation symbols may be provided to the plurality of transmission paths 406-1 to 406-N.

The plurality of transmission paths 406-1 to 406-N may convert the digitally beamformed digital signals to analog signals. In this regard, each of the plurality of transmission paths 406-1 to 406-N may include an inverse fast Fourier transform (IFFT) operator, a cyclic prefix (CP) inserter, a DAC, and an up-converter. The CP inserter is for orthogonal frequency division multiplexing (OFDM) and may be excluded when another physical layer method (for example, a filter bank multi-carrier (FBMC)) is applied. In other words, the plurality of transmission paths 406-1 to 406-N may provide independent signal processing processes to a plurality of streams generated through digital beamforming. However, according to an embodiment of the disclosure, some of elements of the plurality of transmission paths 406-1 to 406-N may be commonly used.

The analog beamformer 408 may perform beamforming on an analog signal. In this regard, the digital beamformer 404 may multiply the analog signals by beamforming weights. In this regard, the beamforming weights are used to change the magnitude and phase of a signal. Specifically, the analog beamformer 440 may be variously configured, based on connection structures between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In another example, the plurality of transmission paths 406-1 to 406-N may be adaptively connected to one antenna array or at least two antenna arrays.

Figure 5:
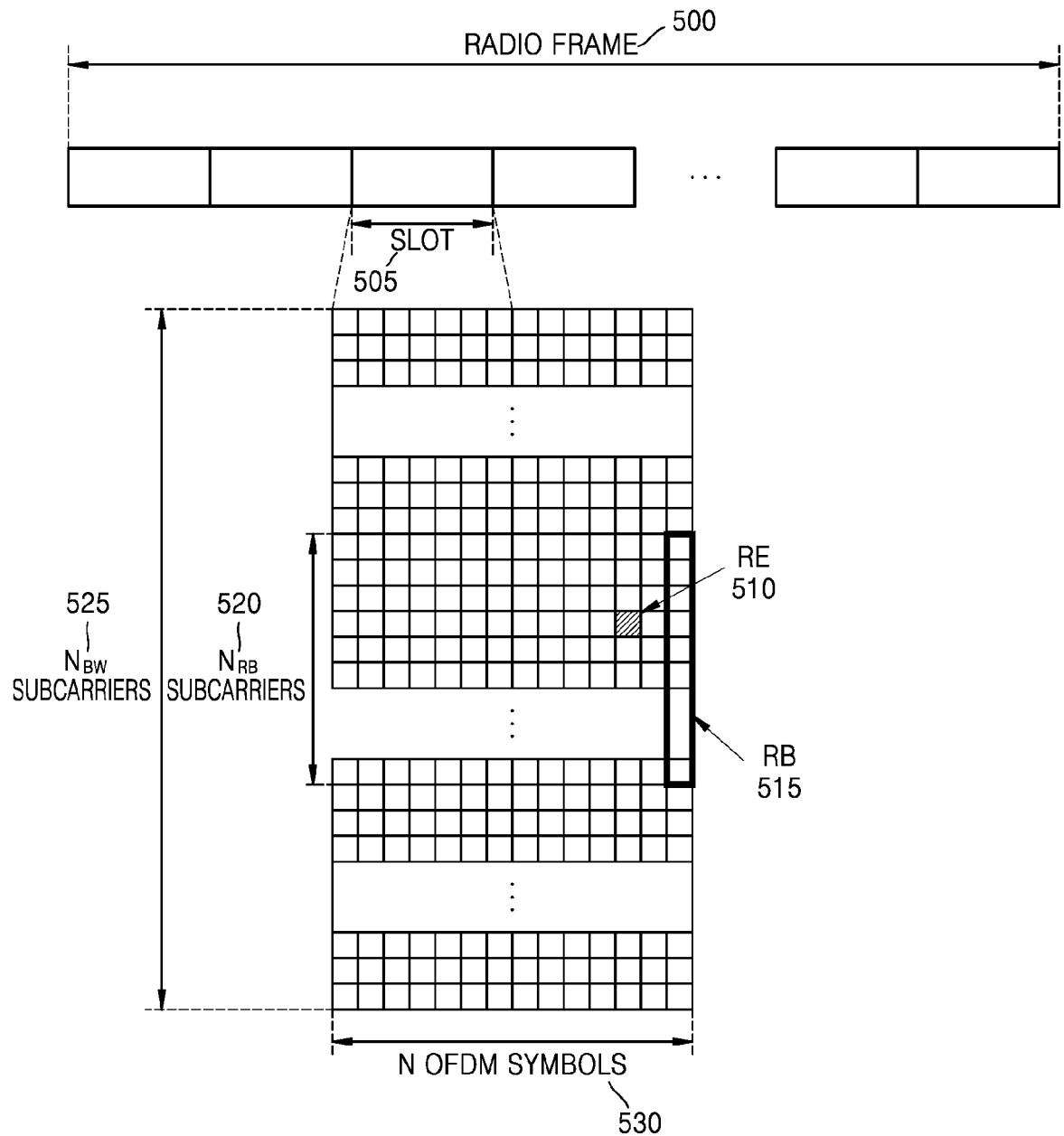
FIG. 5 illustrates a structure of radio time-frequency resources of a wireless communication system according to an embodiment of the disclosure.

FIG. 5 illustrates a structure of radio time-frequency resources of a wireless communication system according to an embodiment of the disclosure.

Referring to FIG. 5, the horizontal axis represents a time domain and the vertical axis represents a frequency domain in a resource domain. A minimum transmission unit in the time domain is an OFDM symbol or DFT-S-OFDM symbol, and Nsymb OFDM symbols or DFT-S-OFDM symbols 530 may be included in one slot 505. Unlike the slot, in an NR system, a length of a subframe may be defined as 1.0 ms, and a length of a radio frame 500 may be defined as 10 ms. A minimum transmission unit in the frequency domain is a subcarrier, and a bandwidth of the whole system transmission band may include a total of NBW subcarriers 525. Specific numerical values, such as Nsymb and NBW, may vary according to a system.

A basic unit of a time-frequency resource domain is a resource element (RE) 510, which may be indicated by an OFDM symbol index or DFT-S-OFDM symbol index and a subcarrier index. A resource block (RB) 515 may be defined as NRB successive subcarriers 525 in the frequency domain. In general, a minimum transmission unit of data is an RB, and in an NR system, Nsymb=14, NRB=12 in general.

A structure of the wireless time-frequency domain as in FIG. 5 may be applied to a Uu interface. In addition, the wireless time-frequency resource structure as in FIG. 5 may be similarly applied to SL.

Figure 6A:
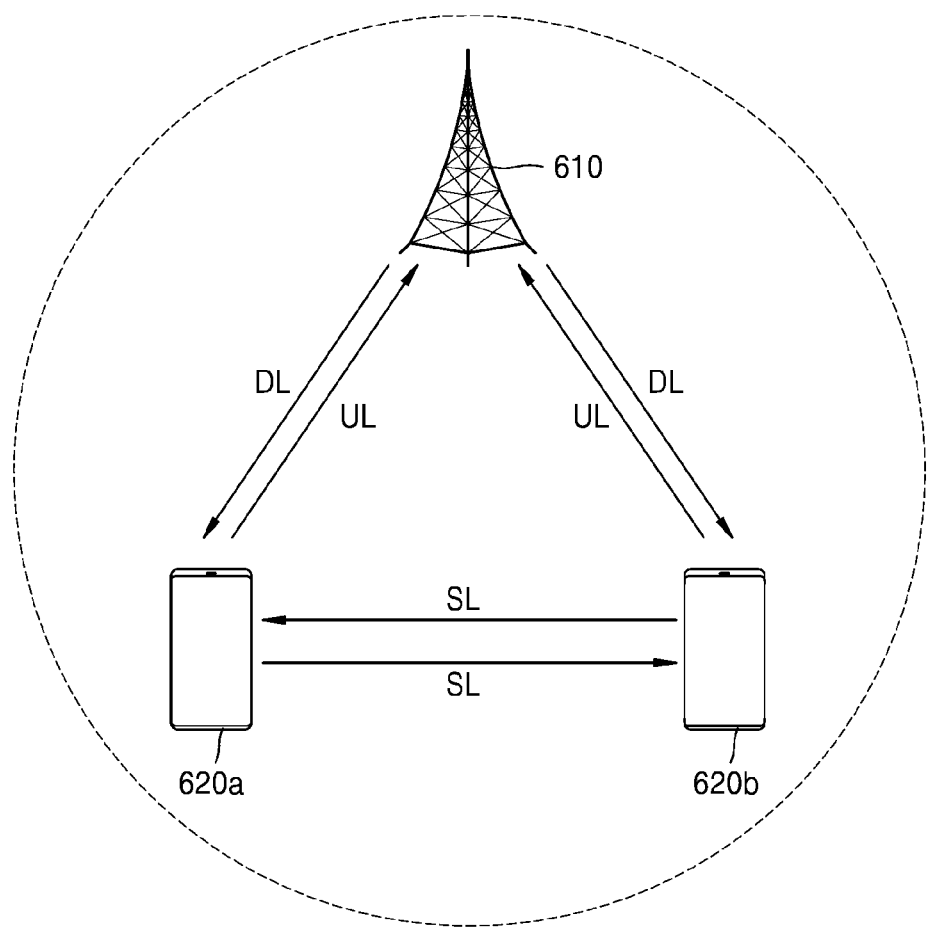
FIG. 6A is a diagram illustrating a scenario of sidelink communication according to an embodiment of the disclosure.

FIG. 6A illustrates an example of a scenario of SL communication according to an embodiment of the disclosure.

FIG. 6A shows an example of an in-coverage scenario in which SL terminals 620a and 620b are located within a coverage of a BS 610. The SL terminals 620a and 620b may receive data and control information via DL from the BS, or may transmit data and control information via UL to the BS. In this case, the data and control information may be data and control information for SL communication, or may be data and control information for a general cellular communication other than SL communication. In addition, in FIG. 6A, the SL terminals 620a and 620b may transmit and receive data and control information for SL communication, via SL.

Figure 6B:
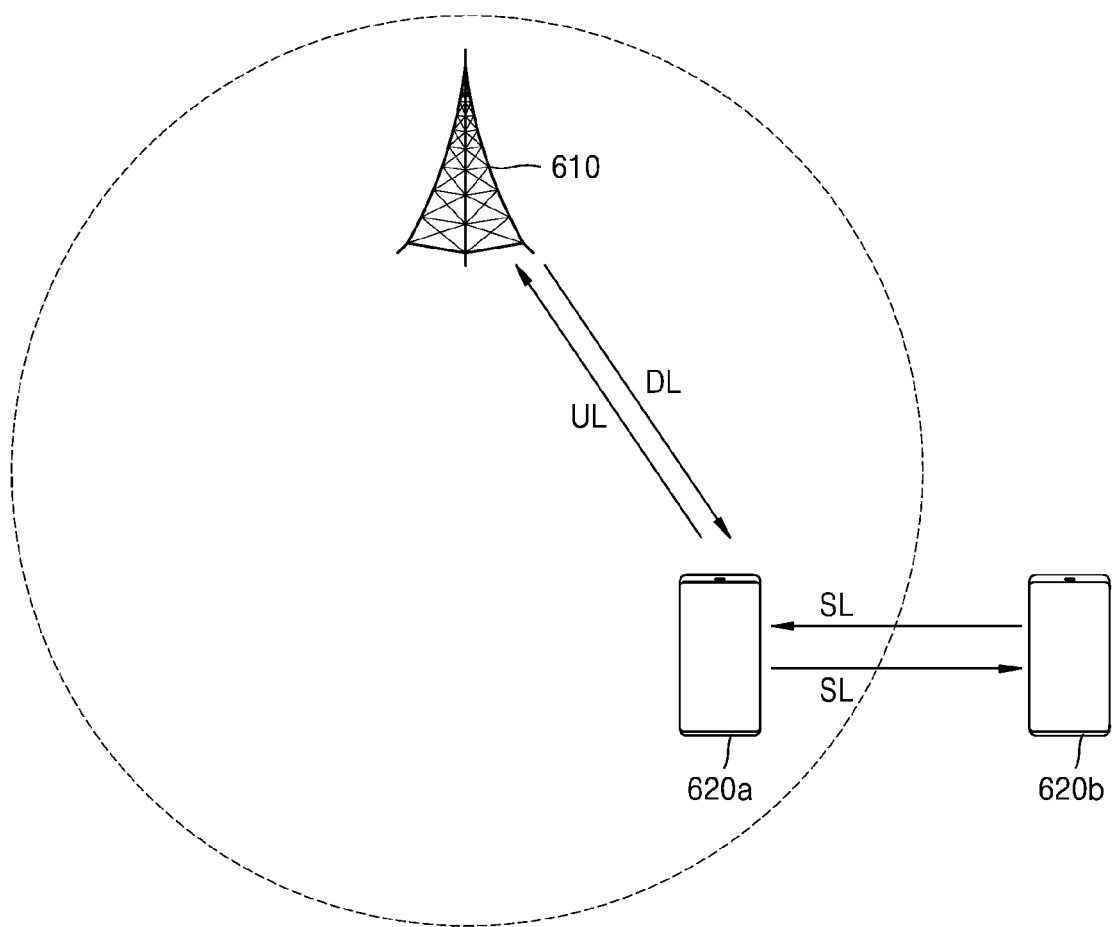
FIG. 6B is a diagram illustrating a scenario of sidelink communication according to an embodiment of the disclosure.

FIG. 6B illustrates an example of a scenario of SL communication according to an embodiment of the disclosure.

Referring to FIG. 6B, a case of partial coverage in which the first terminal 620a from among the SL terminals is located within the coverage of the BS 610 and the second terminal 620b is located outside the coverage of the BS 610 is shown as an example. The first terminal 620a located within the coverage of the BS 610 may receive data or control information via DL from the BS 610, or may transmit data and control information via UL to the BS 610. The second terminal 620b located outside the coverage of the BS 610 cannot receive data and control information via DL from the BS 610, and cannot transmit data and control information via UL to the BS 610. The second terminal 620b may transmit and receive data and control information for SL communication, via SL to and from the first terminal 620a.

Figure 6C:
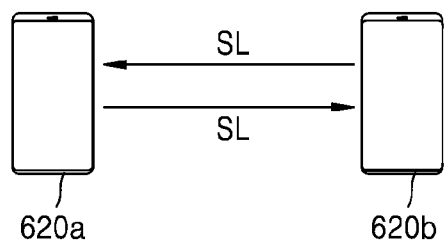
FIG. 6C is a diagram illustrating a scenario of sidelink communication according to an embodiment of the disclosure.

FIG. 6C illustrates an example of a scenario of SL communication according to an embodiment of the disclosure.

Referring to FIG. 6C, a case in which SL terminals (e.g., the first terminal 620a and the second terminal 620b) are located outside the BS is shown. Accordingly, the first terminal 620a and the second terminal 620b cannot receive data and control information via DL from the BS, and cannot transmit data and control information via UL to the BS. The first terminal 620a and the second terminal 620b may transmit and receive data and control information for SL communication, via SL.

Figure 6D:
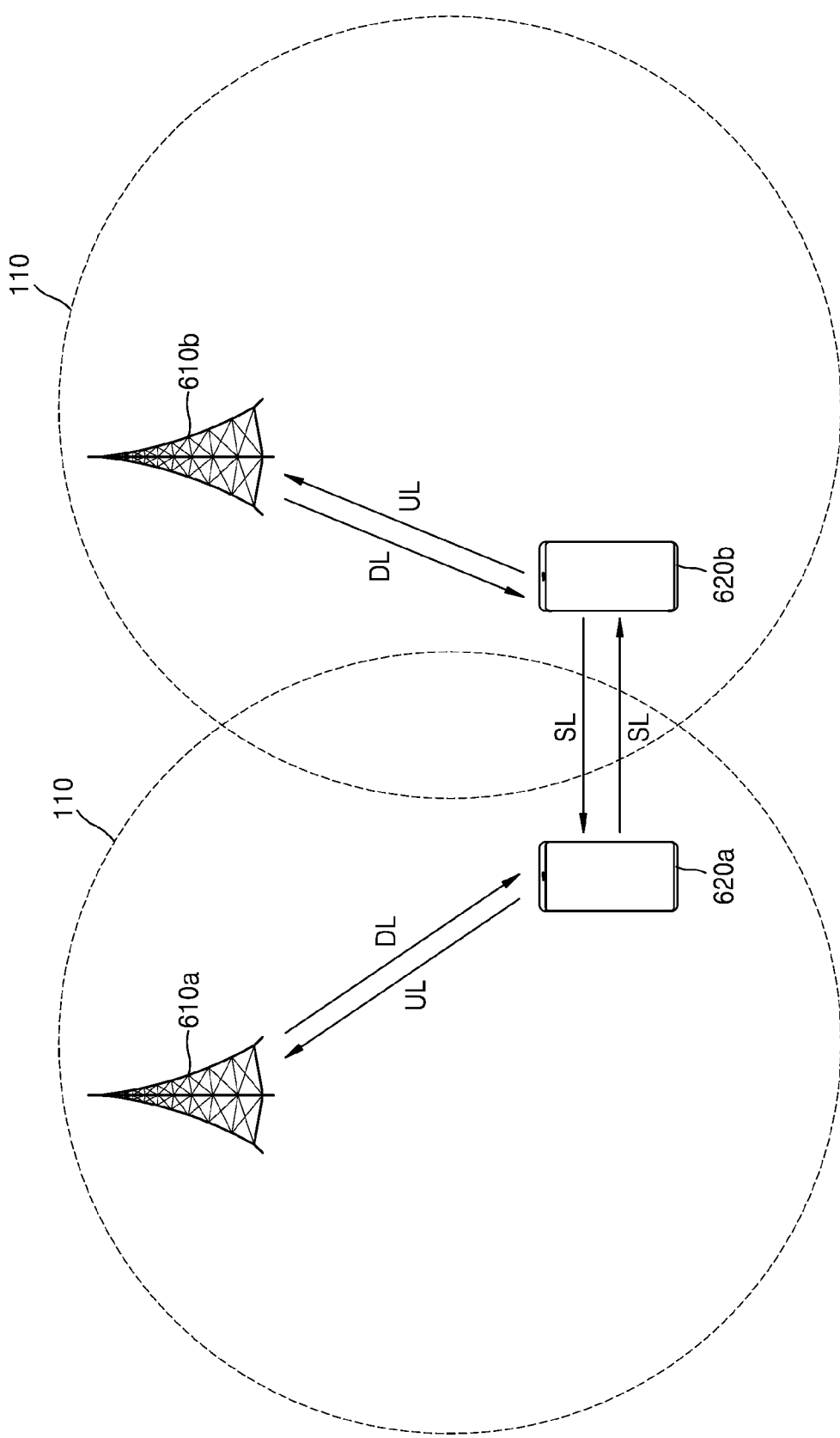
FIG. 6D is a diagram illustrating a scenario of sidelink communication according to an embodiment of the disclosure.

FIG. 6D illustrates an example of a scenario of SL communication according to an embodiment of the disclosure.

Referring to FIG. 6D, the first terminal 620a and the second terminal 620b that perform SL communication may perform an inter-cell SL communication in a state (e.g., an RRC connected state) of being connected to BSs that are different from each other (e.g., a first BS 610*a* and a second BS 610*b*) or in a camping state (e.g., an RRC connection-release state, i.e., an RRC idle state). In this case, the first terminal 620*a* may be a SL transmission terminal, and the second terminal 620*b* may be a SL reception terminal. Alternatively, the first terminal 620*a* may be a SL reception terminal, and the second terminal 620*b* may be a SL transmission terminal. The first terminal 620*a* may receive a SL-dedicated system information block (SIB) from the BS 610*a* to which the first terminal 620*a* is connected (or on which the first terminal 620*a* camps), and the second terminal 620*b* may receive a SL-dedicated SIB from another BS 620 to which the second terminal 620*b* is connected (or on which the second terminal 620*b* camps). In this case, information about the SL-dedicated SIB received by the first terminal 620*a* may be different from information about the SL-dedicated SIB received by the second terminal 620*b*. Accordingly, it is necessary to unify pieces of information so as to perform SL communication between terminals located in different cells.

Although a SL system including two terminals (e.g., the first terminal 610*a* and the second terminal 620*b*) is described above in the examples of FIGS. 6A to 6D, for convenience of explanation, the disclosure is not limited thereto and may be applied to a SL system in which more than two terminals are involved. In addition, UL and DL between the BSs 610, 610*a*, and 610*b* and the SL terminals 620*a* and 620*b* may be referred to as a Uu interface, and SL between the SL terminals may be referred to as a PC-5 interface. In the description below, UL or DL and a Uu interface, and SL and PC-5 may be interchangeably used with each other.

Meanwhile, in the disclosure, the terminal may indicate a vehicle supporting V2V communication, a vehicle or a pedestrian's handset (e.g., a smartphone) supporting V2P communication, a vehicle supporting V2N communication, or a vehicle supporting V2I communication. In addition, in the disclosure, the terminal may indicate an RSU having embedded therein terminal functions, a RSU having embedded therein BS functions, or a RSU having embedded therein some BS functions and some terminal functions.

Figure 7A:
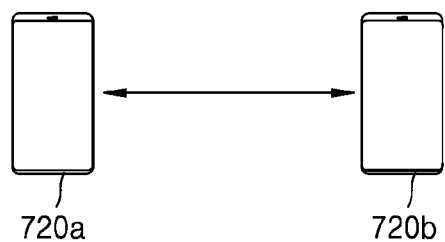
FIG. 7A is a diagram for explaining a transmission scheme of sidelink communication according to an embodiment of the disclosure.
Figure 7B:
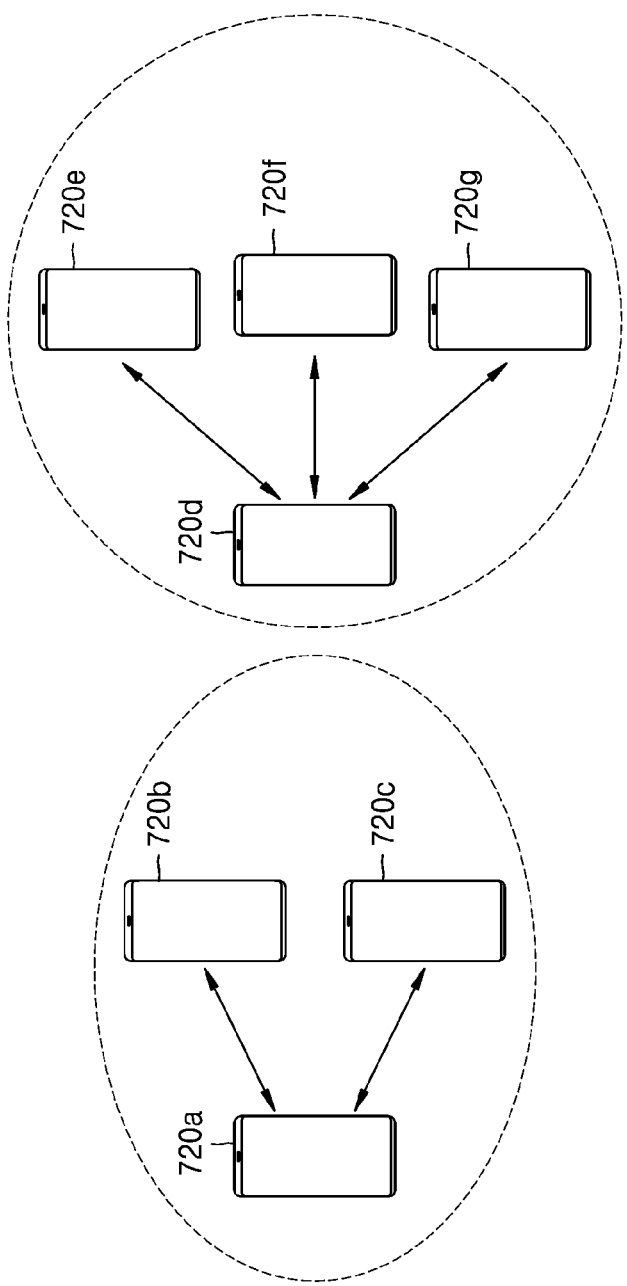
FIG. 7B is a diagram for explaining transmission of sidelink communication according to an embodiment of the disclosure.

FIGS. 7A and 7B are diagrams for explaining a transmission scheme of SL communication according to an embodiment of the disclosure.

Specifically, FIG. 7A illustrates a unicast scheme, and FIG. 7B illustrates a groupcast scheme.

Referring to FIG. 7A, a transmission terminal 720*a* and a reception terminal 720*b* may perform a one-to-one communication. The transmission scheme as in FIG. 7A may be referred to as a unicast communication. Referring to FIG. 7B, transmission terminals 720*a* or 720*d* and reception terminals 720*b*, 720*c*, 720*e*, 720*f*, and 720*g* may perform communication in a one-to-many manner. The transmission scheme as in FIG. 7B may be referred to as groupcast or multicast. In FIG. 7B, the first terminal 720*a*, the second terminal 720*b*, and the third terminal 720*c* may constitute one group and perform a groupcast communication, and the fourth terminal 720*d*, the fifth terminal 720*e*, the sixth terminal 720*f*, and the seventh terminal 720*g* may constitute another group and perform a groupcast communication. The terminals may perform a groupcast communication within a group to which the terminals belong, and may perform a unicast, groupcast, or broadcast communication with at least one other terminal belonging to a different group. Although FIG. 7B illustrates two groups, for convenience of explanation, the disclosure is not limited thereto and may be applied to a case in which a greater number of groups are provided.

Meanwhile, although not shown in FIG. 7A or 7B, SL terminals may perform a broadcast communication. The broadcast communication denotes a scheme in which data and control information transmitted via SL by a SL transmission terminal are received by all SL terminals. For example, in FIG. 7B, when the first terminal 720*a* is a transmission terminal, the remaining terminals 720*b*, 720*c*, 720*d*, 720*e*, 720*f*, and 720*g* may receive data and control information transmitted by the first terminal 720*a*.

The SL unicast communication, groupcast communication, and broadcast communication described above may be supported in an in-coverage, partial-coverage, or out-of-coverage scenario.

In NR SL, unlike LTE SL, a support of a transmission form in which a vehicle terminal transmits data only to one specific terminal via unicast, and a transmission form in which data is transmitted to a plurality of specific terminals via groupcast may be considered. For example, the unicast and groupcast technologies may be useful when a service scenario such as platooning, which is a technology in which two or more vehicles are connected to one network and move as being bound in a group, is considered. Specifically, a leader terminal of a group of which terminals are connected by platooning, may use the unicast communication for the purpose of controlling one specific terminal, and may use the groupcast communication for the purpose of simultaneously controlling a group consisting of a plurality of specific terminals.

The following methods may be used for resource allocation in a V2X system.

(1) Mode 1 Resource Allocation

Scheduled resource allocation is a scheme in which a BS allocates resources to be used for SL transmission, to RRC-connected terminals in a dedicated scheduling method. The scheduled resource allocation may be effective in interference management and resource pool management (dynamic allocation and/or semi-persistent transmission) because the BS may manage resources for SL. When data to be transmitted to other terminal(s) is present, an RRC connected-mode terminal may transmit, to the B S, information notifying that data to be transmitted to other terminal(s) is present, by using an RRC message or a MAC control element (hereinafter, referred to as "CE"). For example, the RRC message transmitted to the BS by the terminal may include SidelinkUEInformation, UEAssistanceInformation messages, and the MAC CE may include BSR MAC CE, a scheduling request (SR), or the like, the BSR MAC CE including at least one of an indicator indicating that the MAC CE is a buffer status report (BSR) for V2X communication or information about a size of data buffered for SL communication.

(2) Mode 2 Resource Allocation

Secondly, UE autonomous resource selection is a scheme in which a SL transmission and reception resource pool for V2X is provided as system information or RRC message (e.g., an RRCReconfiguration message and a PC5-RRC message) to the terminal, and the terminal selects a resource pool and a resource according to a preset rule. The UE autonomous resource selection may correspond to one or more methods from among the resource allocation schemes described below.

UE autonomously selects SL resource for transmission.

UE assists SL resource selection for other UEs.

UE is configured with NR configured grant for SL transmission.

UE schedules SL transmission of other UEs.

The resource selection method of a terminal may include zone mapping, sensing-based resource selection, random selection, and the like.

Additionally, even when the terminal is present within a coverage of the BS, resource allocation or resource selection may not be performed in a scheduled resource allocation or UE autonomous resource selection mode, and in this case, the terminal may perform a V2X SL communication by using a UE random selection method through an exceptional SL transmission and reception resource pool.

In addition, when terminals for V2X communication are present outside the coverage of the BS, the terminal may perform a V2X SL communication through a pre-configured SL transmission and reception resource pool.

When the terminal transmits and receives data based on SL, the SL-based data may be transmitted by using a broadcast scheme or a groupcast scheme. When the terminal transmits and receives SL-based data by using a unicast scheme, PC5-S signaling (e.g., a SL unicast connection setup message), which is transmitted until before a PC5 unicast connection between two terminals is configured, may be transmitted by using a broadcast scheme. In the disclosure, a method of processing SL DRX in a case in which one terminal transmits SL signaling to one or more terminals by using a broadcast, groupcast, or unicast scheme is described through various embodiments.

A terminal configured with SL DRX according to an embodiment of the disclosure may discontinuously monitor SL data availability signaling. The SL data availability signaling may include information about a use of SL data. For example, the SL data availability signaling may be a signal indicating that SL data to be transmitted, or transmit, is present. The SL data availability signaling may include at least one or a combination of information in [Table 1] below. However, the disclosure is not limited to the following example.

TABLE 1

SL control information (SCI)
Physical SL control channel (PSCCH)
SCI transmitted on PSCCH
Physical SL shared channel (PSSCH)
SCI transmitted on PSSCH
Data availability indication transmitted on PSSCH
(The data availability indication transmitted on the PSSCH is at least one of SCI, a SL MAC header, or a SL MAC protocol data unit (PDU))
The data availability signaling may include a combination of SCI and a SL MAC PDU or a combination of SCI and a SL MAC header, and this may correspond to a case in which the terminal may not determine data availability solely from the SCI and the data availability may not be determined until a SL MAC PDU corresponding to the SCI or a SL MAC header corresponding to the SCI is obtained.

According to an embodiment of the disclosure, the terminal configured with SL DRX may discontinuously monitor SCI. According to an embodiment of the disclosure, the terminal configured with SL DRX may discontinuously monitor a PSCCH. According to an embodiment of the disclosure, the terminal configured with SL DRX may discontinuously monitor SCI transmitted on the PSCCH. According to an embodiment of the disclosure, the terminal configured with SL DRX may discontinuously monitor a PSSCH. According to an embodiment of the disclosure, the terminal configured with SL DRX may discontinuously monitor SCI transmitted on the PSSCH. According to an embodiment of the disclosure, the terminal configured with SL DRX may discontinuously monitor a data availability indication transmitted on the PSSCH.

Information included in the SL data availability signaling according to an embodiment of the disclosure may include at least one or a combination in [Table 2] below. However, the disclosure is not limited to the following example.

TABLE 2

Carrier frequency of concerned service or of concerned SL bearer
Carrier (BWP): of concerned service or of concerned SL bearer
Destination ID(s) of concerned service or of concerned UE or of SL bearer
Source ID(s) of concerned service or of concerned UE or of concerned SL bearer
Cast type (if destination ID is not distinguished among different sidelink cast types)
Hybrid automatic repeat and request (HARQ) process ID of concerned service or of concerned UE or of concerned SL bearer
DRX ID of concerned service or of concerned UE or of concerned SL bearer When SL DRX is configured in a terminal, a DRX ID may be used as identification information used in an SL DRX operation by the terminal. In addition, according to an embodiment of the disclosure, the DRX ID identification information may be used to distinguish at least one or a combination of a terminal, a service of a terminal, or a SL radio bearer configured in a terminal. The DRX ID may be configured in the terminal by a network (via RRC dedicated or via system information) or may be pre-configured. The DRX ID may be configured through PC5-RRC message, PC5-S signaling, or PC5 MAC CE, which are exchanged between two terminals performing data transmission and reception based on SL unicast. However, the disclosure is not limited to the example above.

According to an embodiment of the disclosure, when the SL data availability signaling of [Table 2] is transmitted on the PSSCH, control information indicating the SL data availability signaling may be transmitted on a frequency resource different from a frequency resource on which the SL data availability signaling is transmitted. According to an embodiment of the disclosure, when the SL data availability signaling of [Table 2] is transmitted on the PSSCH, control information indicating the SL data availability signaling may be transmitted on a time resource different from a time resource on which the SL data availability signaling is transmitted.

According to an embodiment of the disclosure, when the SL data availability signaling of [Table 2] is configured as additional SCI instead of SCI1 or SCI2 of the related art, the SL data availability signaling may be (1) transmitted on the same frequency and time resources as frequency and time resources on which the SCI1 of the related art is transmitted, (2) transmitted on the same frequency resource as a frequency resource on which the SCI1 of the related art is transmitted, (3) transmitted on the same time resource as a time resource on which the SCI1 of the related art is transmitted, (4) transmitted on a frequency resource different from a frequency resource on which the SCI1 of the related art is transmitted, (5) transmitted on a time resource different from a time resource on which the SCI1 of the related art is transmitted, (6) transmitted on the same frequency and time resources as frequency and time resources on which the SCI2 of the related art is transmitted, (7) transmitted on the same frequency resource as a frequency resource on which the SCI2 of the related art is transmitted, (8) transmitted on the same time resource as a time resource on which the SCI2 of the related art is transmitted, (9) transmitted on a frequency resource different from a frequency resource on which the SCI2 of the related art is transmitted, or (10) transmitted on a time resource different from a time resource on which the SCI2 of the related art is transmitted.

According to an embodiment of the disclosure, the SL data availability signaling of [Table 2] above may include data availability information for one SL DRX configuration. According to an embodiment of the disclosure, the SL data availability signaling of [Table 2] above may include data availability information for a plurality of SL DRX configurations.

According to an embodiment of the disclosure, when SL DRX is configured, SL DRX parameters to be processed by a terminal may include at least one or a combination of [Table 3] below.

TABLE 3 on-duration: duration that the UE waits for, after waking up, to receive SL data availability signals. If the UE successfully decodes a SL data availability signaling, the UE stays awake and starts the inactivity timer;
inactivity-timer: duration that the UE waits to successfully decode a SL data availability signaling, from the last successful decoding of a SL data availability signaling, failing which it can go back to sleep. The UE shall restart the inactivity timer following a single successful decoding of a SL data availability signaling for a first transmission only (i.e. not for retransmissions);
According to an embodiment of the disclosure, the inactivity-timer of the terminal may be configured for each SL DRX cycle. According to an embodiment of the disclosure, the inactivity-timer of the terminal may be configured per SL resource pool. According to an embodiment of the disclosure, the inactivity-timer of the terminal may be configured per SL configured grant. According to an embodiment of the disclosure, the inactivity-timer of the disclosure may be configured per destination ID of a SL service. According to an embodiment of the disclosure, the inactivity-timer of the terminal may be configured per destination ID of a SL group. According to an embodiment of the disclosure, the inactivity-timer of the terminal may be configured per SL flow.
According to an embodiment of the disclosure, the inactivity-timer of the terminal may be configured per SL radio bearer.
retransmission-timer: duration until a retransmission can be expected;
cycle: specifies the periodic repetition of the on-duration followed by a possible period of inactivity
active-time: total duration that the UE monitors SL data availability signaling. This includes the "on-duration" of the DRX cycle, the time UE is performing continuous reception while the inactivity timer has not expired, and the time when the UE is performing continuous reception while waiting for a retransmission opportunity.
NW configures a configuration for SL DRX via RRC dedicated/SIB/pre-configuration.
One configuration or multiple configurations for SL DRX
DRX cycle (period)
Offset from SFN
On-duration
Time (period, offset), frequency (carrier, BWP) of configuration
The time and/or frequency can be configured per cast type.
The time and/or frequency can be configured per service (associated destination, associated carrier).

TABLE 3-continued

Figure 8A:
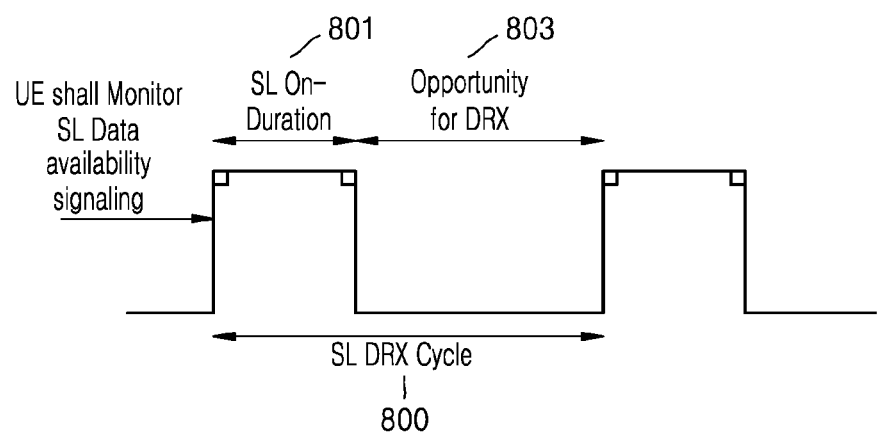
FIG. 8A is a diagram for explaining an operation by a terminal for processing sidelink discontinuous reception (DRX), according to an embodiment of the disclosure.

The time and/or frequency can be configured regardless of service/cast type (i.e., one resource for data availability signaling).
Destination ID A SL DRX cycle according to an embodiment of the disclosure may be configured as in FIG. 8. Referring to FIG. 8A, a SL DRX cycle 800 may include an on-duration 801 and a DRX opportunity 803. When a SL DRX is configured, a terminal may monitor SL data availability signaling in the on-duration 801. The terminal may not monitor SL data availability signaling in the DRX opportunity 803. When the SL DRX is configured, the terminal may obtain SL DRX configuration information including at least one of information about the SL DRX cycle 800 or information about the on-duration 801. The terminal may obtain the SL DRX configuration information from a network (NW) (via an RRC dedicated message or system information message) or from pre-configured information. The NW may be at least one entity (or function) of a core network (CN), may be a BS (RAN), or may include all entities supporting SL communication, other than a terminal, without being limited to the example above.

The SL DRX cycle 800 of FIG. 8A may be configured based on a SL resource pool configuration. An embodiment of a SL DRX cycle configuration based on a SL resource pool configuration is described with reference to FIGS. 8B to 8C. In an embodiment, when a SL DRX cycle is configured based on a SL resource pool configuration, the resource pool may include a transmission pool and a reception pool. In an embodiment, when the SL DRX cycle is configured based on the SL resource pool configuration, the resource pool may include a reception pool.

Figure 8B:
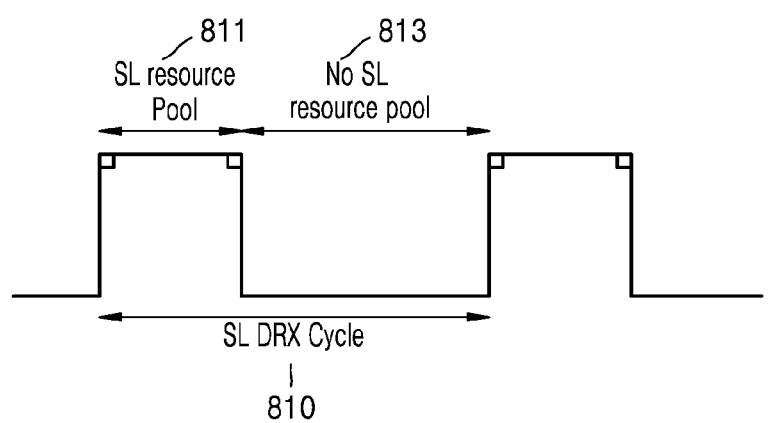
FIG. 8B is a diagram for explaining an operation by a terminal for processing sidelink DRX, according to an embodiment of the disclosure.

Referring to FIG. 8B, a SL DRX cycle 810 may include a period, 811, in which a SL resource pool is configured, and a period, 813, in which a SL resource pool is not configured. The period, 811, in which the SL resource pool is configured, may correspond to the on-duration of FIG. 8A, and the period, 813, in which the SL resource pool is not configured, may correspond to the DRX opportunity of FIG. 8A. When the SL DRX is configured, the terminal may monitor a SL data availability signaling in the SL resource pool period 811. The terminal may not monitor the SL data availability signaling in the period, 813, in which the SL resource pool is not configured. When the SL DRX is configured, the terminal may obtain SL DRX configuration information from SL resource pool configuration information, the SL DRX configuration information including at least one of the SL DRX cycle 810 or the on-duration 811. The terminal may obtain the SL DRX configuration information from the network (NW) or from pre-configured information.

Figure 8C:
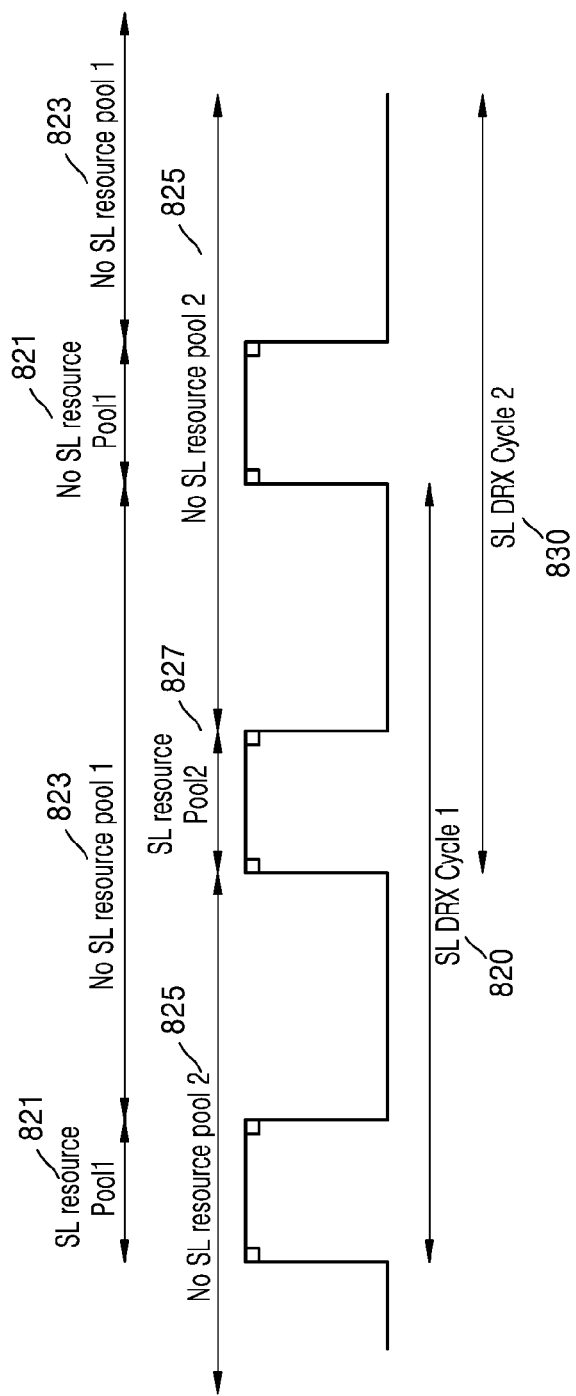
FIG. 8C is a diagram for explaining an operation by a terminal for processing sidelink DRX, according to an embodiment of the disclosure.

In the method described with reference to FIG. 8B, the SL DRX cycle may be configured according to a SL resource pool period, regardless of a SL service of interest of the terminal. When the SL service of interest of the terminal is not provided per SL resource pool period, the terminal may not monitor a SL data availability signaling in an unnecessary SL resource pool period. FIG. 8C describes a method of configuring a SL DRX cycle such that the terminal may monitor a SL data availability signaling in a SL resource pool period in which a SL service of interest of the terminal is provided.

Referring to FIG. 8C, a SL DRX cycle 1 820 may include a period, 821, in which a SL resource pool for service 1 is configured, and a period, 823, in which the SL resource pool for service 1 is not configured. A SL DRX cycle 2 830 may include a period, 827, in which a SL resource pool for service 2 is configured, and a period, 825, in which the SL resource pool for service 2 is not configured. The periods, 821 and 827, in which a SL resource pool is configured, may correspond to the on-duration of FIG. 8A, and the periods, 823 and 825, in which a SL resource pool is not configured, may correspond to the DRX opportunity of FIG. 8A.

When a SL DRX is configured, the terminal may monitor a SL data availability signaling in the SL resource pool period 1 821, with respect to service 1 of interest of the terminal. The terminal may not monitor a SL data availability signaling in the period, 823, in which a SL resource pool is not configured, with respect to service 1 of interest of the terminal. The terminal may monitor a SL data availability signaling in the SL resource pool period 827, with respect to service 2 of interest of the terminal. The terminal may not monitor a SL data availability signaling in the period, 825, in which a SL resource pool is not configured, with respect to service 2 of interest of the terminal.

When the SL DRX is configured, the terminal may obtain SL DRX configuration information including at least one of the SL DRX cycle 820, 830 or the on-duration 821, 827, with respect to a service of interest of the terminal. The terminal may obtain the SL DRX configuration information per service from SL resource pool configuration information or from additional DRX configuration information per resource pool. The terminal may obtain the SL DRX configuration information from a network (NW) (via an RRC dedicated message or system information) or from pre-configured information. An operation of a terminal and a BS for performing a SL DRX configuration according to a service of interest of the terminal is described with reference to FIG. 10.

In addition to the method of FIGS. 8A to 8C, a SL DRX cycle may be configured. In other words, a DRX cycle, which is a SL DRX cycle, and an on-duration may be configured based on a SL configured grant resource configuration of a terminal. In an embodiment of the disclosure, when a SL DRX is configured in the terminal, the SL DRX cycle and the on-duration may be configured based on a SL configured grant configuration (a configured grant period, a time offset, and a time resource) configured in the terminal.

For example, one or more SL configured grant resource configurations are allocated to the terminal, a SL DRX cycle and an on-duration per configured grant resource configuration may be configured. In another example, when one or more SL configured grant resource configuration is allocated to the terminal, an optimum SL DRX cycle and on-duration (one or more DRX cycles and on-durations) may be configured by combining all of the configured grant resource configurations. An operation by the terminal and the BS for performing a configured grant resource configuration and an SL DRX configuration of the terminal is described with reference to FIG. 10.

In addition to the method of FIGS. 8A to 8C, a SL DRX cycle may be configured. In other words, a DRX cycle and an on-duration may be configured per service of interest of the terminal. The terminal may obtain SL DRX configuration information from a network (NW) (via an RRC dedicated message or system information) or from pre-configured information. An operation by a terminal and a BS for performing a SL DRX configuration according to a service of interest of the terminal is described with reference to FIG. 10.

According to an embodiment of the disclosure, the terminal (UE) may notify SL DRX support capability information to the network (NW). The SL DRX support capability information of the UE may include at least one or a combination of information in [Table 4] below.

TABLE 4

Support of SL DRX (Whether the terminal supports SL DRX)
Support of unicast DRX (Whether the terminal supports DRX for SL unicast)
Support of broadcast DRX (Whether the terminal supports DRX for SL broadcast)
Support of groupcast DRX (Whether the terminal supports DRX for SL groupcast)
Support of SL short DRX cycle (Whether the terminal supports a short cycle of SL DRX)
Support of SL long DRX cycle (Whether the terminal supports a long cycle of SL DRX)

Figure 9:
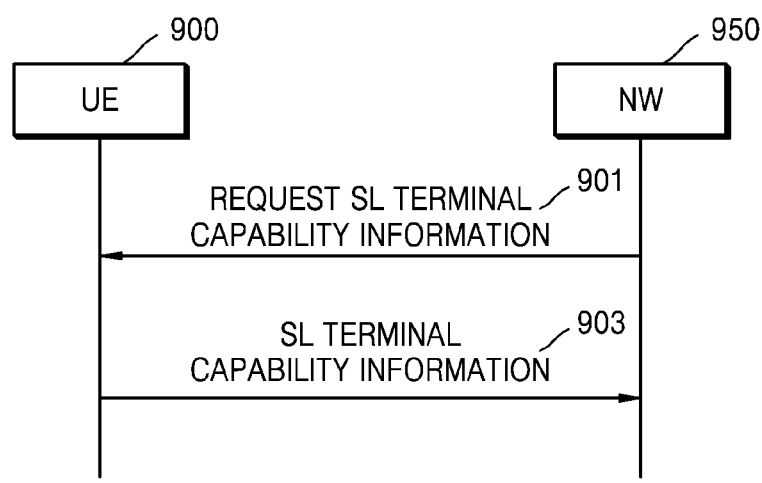
FIG. 9 is a diagram for explaining an operation by a terminal for processing sidelink DRX, according to an embodiment of the disclosure.

FIG. 9 is a diagram for explaining an operation by a terminal for processing SL DRX, according to an embodiment of the disclosure.

Referring to FIG. 9, a NW 950 supporting SL communication may transmit a SL capability information request message of a UE 900, in operation 901, so as to obtain SL capability information of the UE 900. The UE 900 receiving the SL terminal capability information request message in operation 901 may transmit a SL terminal capability information message to the NW 950, in operation 903. The SL terminal capability information message of operation 903 may include the SL DRX support capability information in [Table 4] above.

Figure 10A:
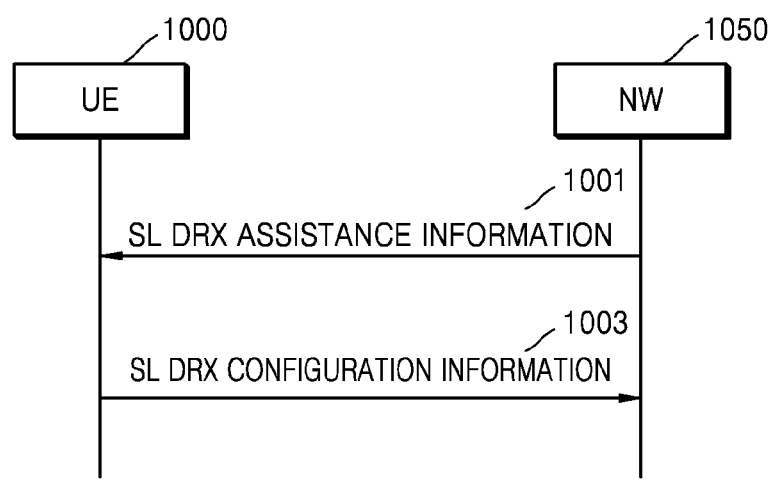
FIG. 10A is a diagram for explaining an operation by a terminal for processing sidelink DRX, according to an embodiment of the disclosure.
Figure 10B:
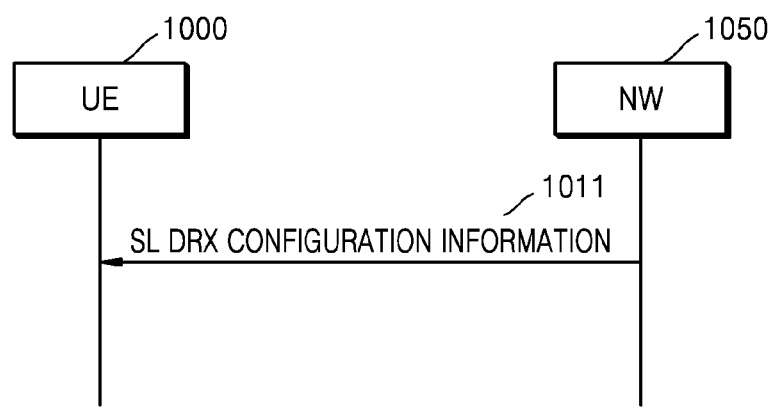
FIG. 10B is a diagram for explaining an operation by a terminal for processing sidelink DRX, according to an embodiment of the disclosure.
Figure 10C:
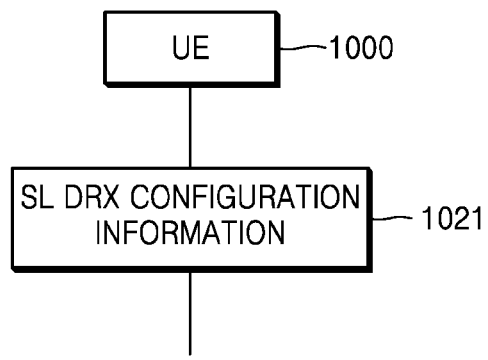
FIG. 10C is a diagram for explaining an operation by a terminal for processing sidelink DRX, according to an embodiment of the disclosure.

FIGS. 10A to 10C are diagrams for explaining an operation by a terminal for processing SL DRX, according to an embodiment of the disclosure. FIGS. 10A to 10C show an operation by a terminal for performing a SL DRX configuration based on a service of interest of the terminal. FIG. 10A shows a case in which the terminal performs a SL-based data transmission and reception in an RRC_CONNECTED state, FIG. 10B shows a case in which the terminal performs the SL-based data transmission and reception in an RRC_IDLE state or an RRC_INACTIVE state, and FIG. 10C shows a case in which the terminal performs the SL-based data transmission and reception in an OUT_OF_COVERAGE state.

Referring to FIG. 10A, a UE 1000 may transmit, to a NW 1050, a signaling including SL DRX assistance information, in operation 1001. The signaling including the SL DRX assistance information may include at least one of a UEAssistanceInformation message or a SidelinkUEInformation message. However, the disclosure is not limited to the example above.

The SL DRX assistance information may include at least one or a combination of a destination ID corresponding to a service of interest of the terminal, a destination ID corresponding to a group of interest of the terminal, a SL flow, a PQI of the SL flow, a frequency corresponding to the service of interest of the terminal, traffic pattern information of the service of interest of the terminal (a period, a message size, a time offset, etc.).

The NW 1050 receiving the SL DRX assistance information in operation 1001 may configure SL DRX in the UE 1000, and may transmit a signaling including SL DRX configuration information to the UE 1000, in operation 1003. The SL DRX configuration information may include at least one or a combination of a SL DRX cycle, an on-duration, or an inactivity-timer, which are to be used by a terminal in which the SL DRX is configured.

The SL DRX configuration information may include at least one of whether DRX based on a SL resource pool or DRX based on a SL configured grant is operated. In a case of a DRX operation based on a SL resource pool, the SL DRX configuration information may include SL resource pool information configured in SL DRX of the terminal. In a case of a DRX operation based on a SL configured grant, the SL DRX configuration information may include SL configured grant information configured in SL DRX of the terminal. When the SL DRX configuration is configured according to a service of the terminal, the SL DRX configuration information may include a SL DRX configuration with respect to service information (frequency information and destination information) of the terminal.

Referring to FIG. 10B, the UE 1000 may obtain SL DRX configuration information from the NW 1050, in operation 1011. The SL DRX configuration information may be included in a SL system information message transmitted by the NW 1050. However, the disclosure is not limited to the example above.

The SL DRX configuration information may include at least one or a combination of a SL DRX cycle, an on-duration, or an inactivity-timer, which are to be used by a terminal in which the SL DRX is configured. The SL DRX configuration information may include whether DRX based on a SL resource pool is operated. In a case of a DRX operation based on a SL resource pool, the SL DRX configuration information may include SL resource pool information configured in SL DRX of the terminal. When the SL DRX configuration is configured according to a service of the terminal, the SL DRX configuration information may include a SL DRX configuration with respect to service information (frequency information and destination information) of the terminal.

Referring to FIG. 10C, the UE 1000 may obtain pre-configured SL DRX configuration information, in operation 1021. The SL DRX configuration information may be included in pre-configured SL configuration information. The SL DRX configuration information may include at least one or a combination of a SL DRX cycle, an on-duration, or an inactivity-timer, which are to be used by a terminal in which the SL DRX is configured.

The SL DRX configuration information may include whether DRX based on a SL resource pool is operated. In a case of a DRX operation based on a SL resource pool, the SL DRX configuration information may include SL resource pool information configured in SL DRX of the terminal. When the SL DRX configuration is configured according to a service of the terminal, the SL DRX configuration information may include a SL DRX configuration with respect to service information (frequency information and destination information) of the terminal.

Figure 11A:
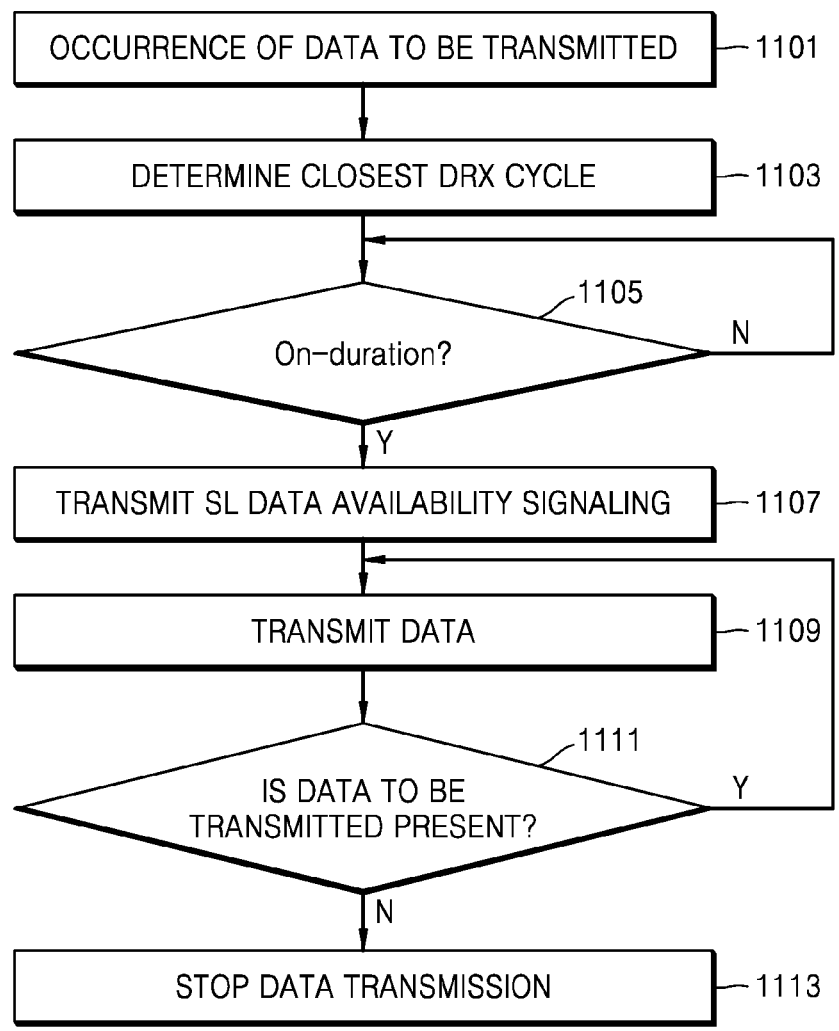
FIG. 11A is a diagram for explaining an operation by a terminal for processing sidelink DRX, according to an embodiment of the disclosure.
Figure 11B:
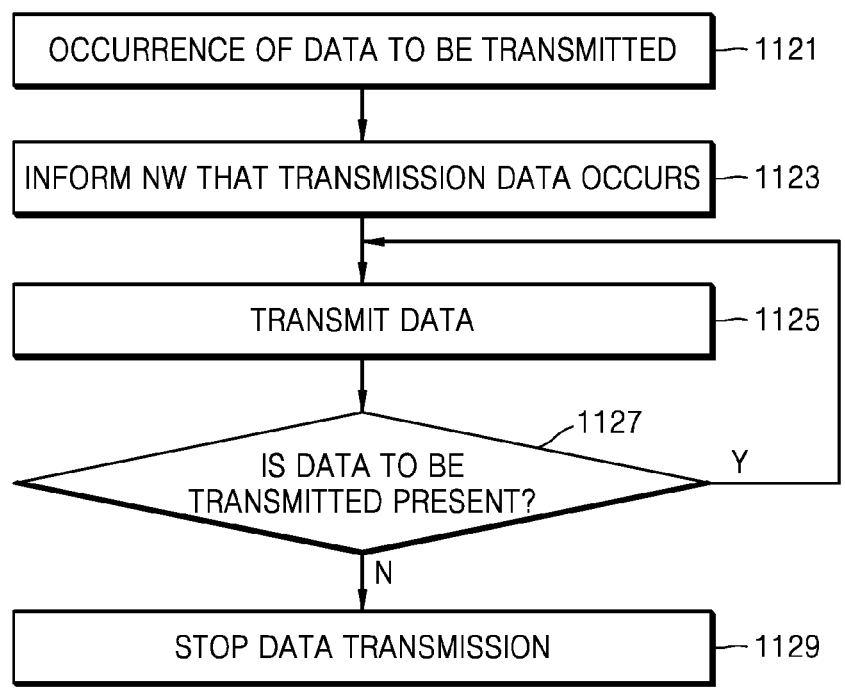
FIG. 11B is a diagram for explaining an operation by a terminal for processing sidelink DRX, according to an embodiment of the disclosure.
Figure 11C:
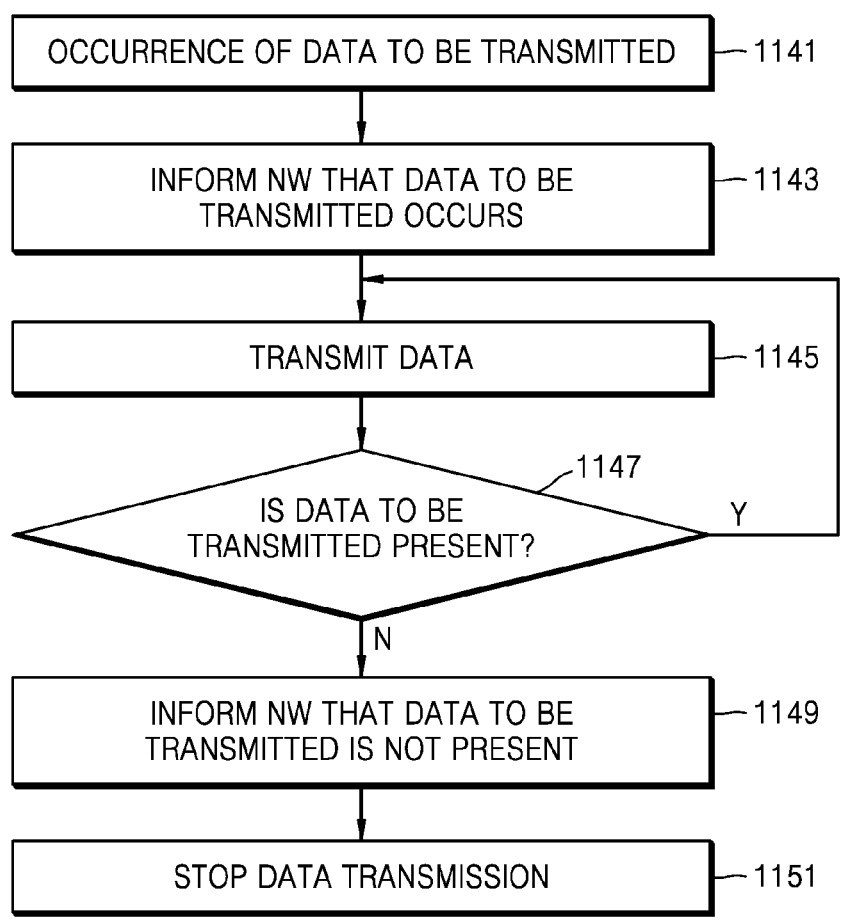
FIG. 11C is a diagram for explaining an operation by a terminal for processing sidelink DRX, according to an embodiment of the disclosure.

FIGS. 11A to 11C are diagrams for explaining an operation by a terminal for processing SL DRX, according to an embodiment of the disclosure. FIGS. 11A to 11C show an operation by a transmission terminal.

FIG. 11A shows an operation by the terminal for determining occurrence of data to be transmitted, determining a SL DRX cycle and an on-duration, transmitting a SL data availability signaling, and transmitting SL data therefor.

Referring to FIG. 11A, the terminal may recognize occurrence of data to be transmitted, in operation 1101. When SL DRX is configured, the terminal may determine a closest DRX cycle and on-duration, in operation 1103. The closest DRX cycle and the on-duration may correspond to a DRX cycle and an on-duration of SL DRX configuration information corresponding to the occurred data.

The terminal may determine whether the closest DRX cycle and the on-duration correspond to the occurred data, based on at least one of a destination ID, a frequency, a SL flow, or a SL radio bearer of the data. The terminal may determine whether on-duration, in operation 1105. When it is on-duration according to the determination of operation 1105, the terminal may transmit a SL data availability signaling corresponding to the occurred data, in operation 1107. When it is not on-duration according to the determination of operation 1105, the terminal may wait until it is on-duration.

The terminal transmitting the SL data availability signaling in operation 1107 may transmit data corresponding to the SL data availability signaling, in operation 1109.

The terminal may determine whether there is data to be transmitted, in operation 1111. When there is data to be transmitted, according to the determination of operation 1111, the terminal may proceed to operation 1109. When it is determined that there is no data to be transmitted, according to the determination of operation 1111, the terminal may stop the data transmission operation after transmitting last data, in operation 1113.

When it is determined that data is the last data, in operation 1111, the terminal may transmit a signaling of no more data availability indicating that there is no more data present. The signaling of no more data availability may include, for example, at least one or a combination of a destination corresponding to a service (or group), a frequency corresponding to the service, a SL flow, a SL radio bearer, or a hybrid automatic repeat and request (HARQ) process ID.

According to an embodiment of the disclosure, the signaling of no more data availability may be transmitted together with the last data. The signaling of no more data availability may be transmitted after the last data is transmitted. The signaling of no more data availability may perform assistance such that the reception terminal quickly transitions to a DRX off (sleep) period after receiving the data. The signaling of no more data availability may be transmitted via at least one of SCI, PC5-RRC signaling, or PC5 MAC CE, which are transmitted to the reception terminal from the transmission terminal. However, disclosure is not limited to the example above.

FIG. 11B shows an operation by a terminal for determining whether there is data to be transmitted, requesting the NW for transmission of a SL data availability signaling, and transmitting SL data corresponding to the SL data availability signaling in an on-duration or active time of SL DRX.

Referring to FIG. 11B, the terminal may recognize occurrence of data to be transmitted, in operation 1121. When SL DRX is configured, the terminal may inform the BS that there is data to be transmitted, and request the BS to transmit a SL data transmission notification, in operation S1123.

A SL data transmission notification signaling transmitted by the BS may include information included in a SL data availability signaling, and for example, may include at least one or a combination of destination information corresponding to a service (or group), frequency information corresponding to the service, SL flow information, SL radio bearer information, a SL data transmission indicator, or a HARQ process ID.

The terminal may determine a closest DRX cycle and an on-duration. The closest DRX cycle and the on-duration may correspond to a DRX cycle and an on-duration of SL DRX configuration information corresponding to the occurred data. The terminal may determine whether the closest DRX cycle and the on-duration correspond to the occurred data, based on at least one of a destination ID, a frequency, a SL flow, a SL radio bearer, or a HARQ process ID of the data.

The terminal may transmit the data in the on-duration or active time of the SL DRX cycle, in operation 1125. The terminal may determine whether there is data to be transmitted, in operation 1127.

When there is data to be transmitted, according to the determination of operation 1127, the terminal may proceed to operation 1125. When it is determined that there is no data to be transmitted, according to the determination of operation 1127, the terminal may stop the data transmission operation after transmitting last data, in operation 1129.

When it is determined that the data is the last data, in operation 1127, the terminal may transmit a signaling of no more data availability indicating that there is no more data present. The signaling of no more data availability may include, for example, at least one or a combination of a destination corresponding to a service (or group), a frequency corresponding to the service, a SL flow, a SL radio bearer, a SL data transmission stop indicator, or a HARQ process ID. The signaling of no more data availability may be transmitted together with the last data. The signaling of no more data availability may be transmitted after the last data is transmitted. The signaling of no more data availability may perform assistance such that the reception terminal quickly transitions to a DRX off (sleep) period after receiving data.

In the embodiment of FIG. 11B, a message used by the BS to transmit the SL data transmission notification to the reception terminal in which the SL DRX is configured may include at least one or a combination of a system information message, a paging message, or a multicast broadcast system (MBS) broadcast message. However, the disclosure is not limited to the example above.

The transmission terminal determining that there is no more data to be transmitted, in operation 1147 of FIG. 11B, may perform an operation of requesting the network to transmit a signaling informing that there is no SL data to be transmitted. The operation by the transmission terminal as described above is described with reference to FIG. 11C.

Referring to FIG. 11C, the terminal may recognize that data to be transmitted has occurred, in operation 1141. When SL DRX is configured, the terminal may inform the BS that there is data to be transmitted, and request the BS to transmit a SL data transmission notification, in operation S1143. A SL data transmission notification signaling transmitted by the BS may include information included in a SL data availability signaling, and for example, may include at least one or a combination of destination information corresponding to a service (or group), frequency information corresponding to the service, SL flow information, SL radio bearer information, a SL data transmission indicator, or a HARQ process ID.

The terminal may determine a closest DRX cycle and an on-duration. The closest DRX cycle and the on-duration may correspond to a DRX cycle and an on-duration of SL DRX configuration information corresponding to the occurred data. The terminal may determine whether the closest DRX cycle and the on-duration correspond to the occurred data, based on at least one of a destination ID, a frequency, a SL flow, a SL radio bearer, or a HARQ process ID of the data.

The terminal may transmit data in the on-duration or active time of the SL DRX cycle, in operation 1145. The terminal may determine whether data to be transmitted remains, in operation 1147.

When the data to be transmitted remains, according to the determination of operation 1147, the terminal may proceed to operation 1145. When it is determined that data to be transmitted does not remain, according to the determination of operation 1147, the terminal may request the BS to transmit a SL data transmission stop notification signaling, in operation 1149. When the request for the SL data transmission stop notification is received from the transmission terminal, the BS may transmit the SL data transmission stop notification signaling.

The SL data transmission stop notification signaling may include information included in the signaling of no more data availability, and for example, may include at least one or a combination of a destination corresponding to a service (or group), a frequency corresponding to the service, a SL flow, a SL radio bearer, a SL data transmission stop indicator, or a HARQ process ID. After transmitting last data, the terminal may stop the data transmission operation, in operation 1151.

In the embodiment of FIG. 11C, the message used by the BS to transmit the SL data transmission notification or SL data transmission stop notification to the reception terminal, in which the SL DRX is configured, may include at least one or a combination of a system information message, a paging message, or an MBS broadcast message. However, the disclosure is not limited to the example above.

FIGS. 12A to 12E are diagrams for explaining an operation by a terminal for processing SL DRX, according to an embodiment of the disclosure. FIGS. 12A to 12E show an operation by a reception terminal for performing a SL DRX operation based on a SL data availability signaling transmitted by a transmission terminal.

According to an embodiment of the disclosure, the reception terminal may perform at least one of monitoring of a SL data availability signaling or monitoring of a signaling transmitted by the transmission terminal, in the on-duration or active time of a SL DRX cycle. The on-duration or active time of the SL DRX cycle of the terminal may be configured to correspond to a SL reception resource pool.

The reception terminal may continuously perform the monitoring of the SL data availability signaling and the monitoring of the signaling transmitted by the transmission terminal, during a SL reception resource pool configuration period. When an inactivity-timer is configured, the reception terminal may monitor the SL data availability signaling or the signaling transmitted by the transmission terminal, until the inactivity-timer expires. When the inactivity-timer is configured, the reception terminal may not perform the monitoring of the SL data availability signaling or the signaling transmitted by the transmission terminal, when the inactivity-timer expires.

When a signaling of no more data availability is received, the reception terminal may not perform the monitoring of the SL data availability signaling or the signaling transmitted by the transmission terminal. The reception terminal may determine whether at least one of service information corresponding to the reception terminal, a destination ID of the service, a source ID of the service, a SL flow, a SL radio bearer, or a HARQ process ID is indicated in the received SL data availability signaling or the signaling transmitted by the transmission terminal. When the same destination ID is mapped to different source IDs and used, the reception terminal may determine whether a mapping of a source ID to the destination ID corresponds to the reception terminal.

A detailed operation procedure of the reception terminal is described with reference to FIGS. 12A to 12E.

Figure 12A:
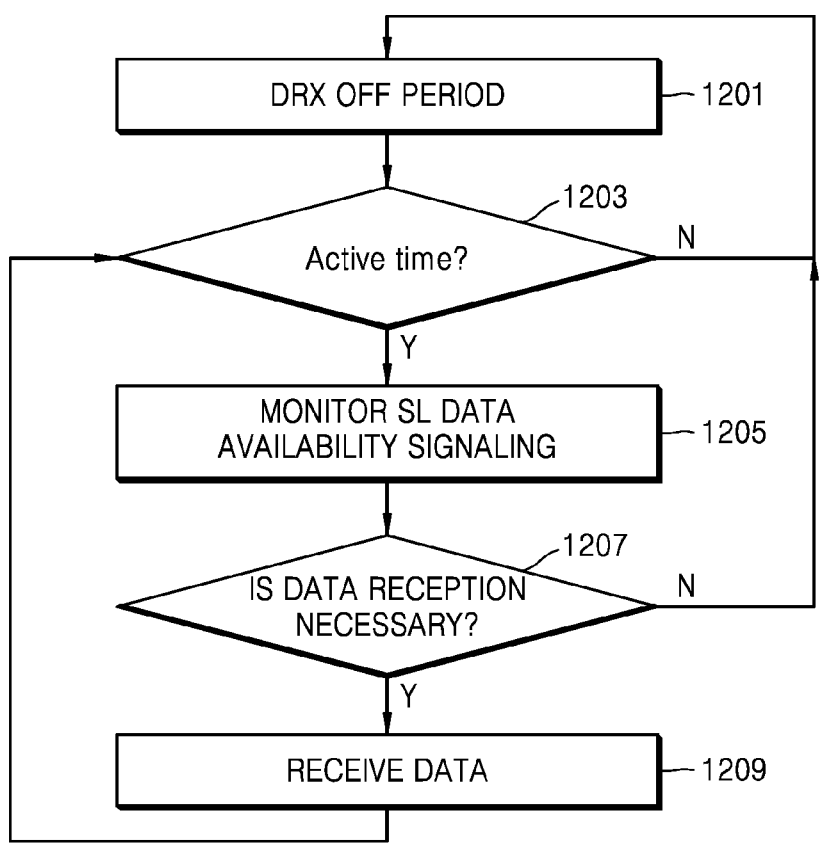
FIG. 12A is a diagram for explaining an operation by a terminal for processing sidelink DRX, according to an embodiment of the disclosure.

Referring to FIG. 12A, the terminal may perform a DRX off period operation, in operation 1201. The terminal may determine whether an active time is configured, in operation 1203. The active time of operation 1203 may be determined based on a SL DRX cycle corresponding to the terminal and an on-duration corresponding thereto. When it is determined that it is not an active time, in operation 1203, the terminal may proceed to operation 1201.

When it is determined that it is an active time, in operation 1203, the terminal may proceed to operation 1205 and monitor a SL data availability signaling. The SL data availability signaling monitoring operation by the reception terminal denotes receiving the signaling transmitted in operation 1107 of FIG. 11A, by the transmission terminal.

The terminal may determine the necessity of data reception (or the necessity of monitoring a signaling transmitted by the transmission terminal), based on the SL data availability signaling, in operation 1207. When it is necessary to receive data (or to monitor the signaling transmitted by the transmission terminal), according to the determination of operation 1207, the terminal may proceed to operation 1209 and receive data (monitor the signaling transmitted by the transmission terminal) and proceed to operation 1203. In the active time of operation 1203, the terminal may determine whether it is necessary to continuously monitor the transmission by the transmission terminal. When it is not necessary to receive data (or to monitor the signaling transmitted by the transmission terminal), according to the determination of operation 1207, the terminal may proceed to operation 1201.

Figure 12B:
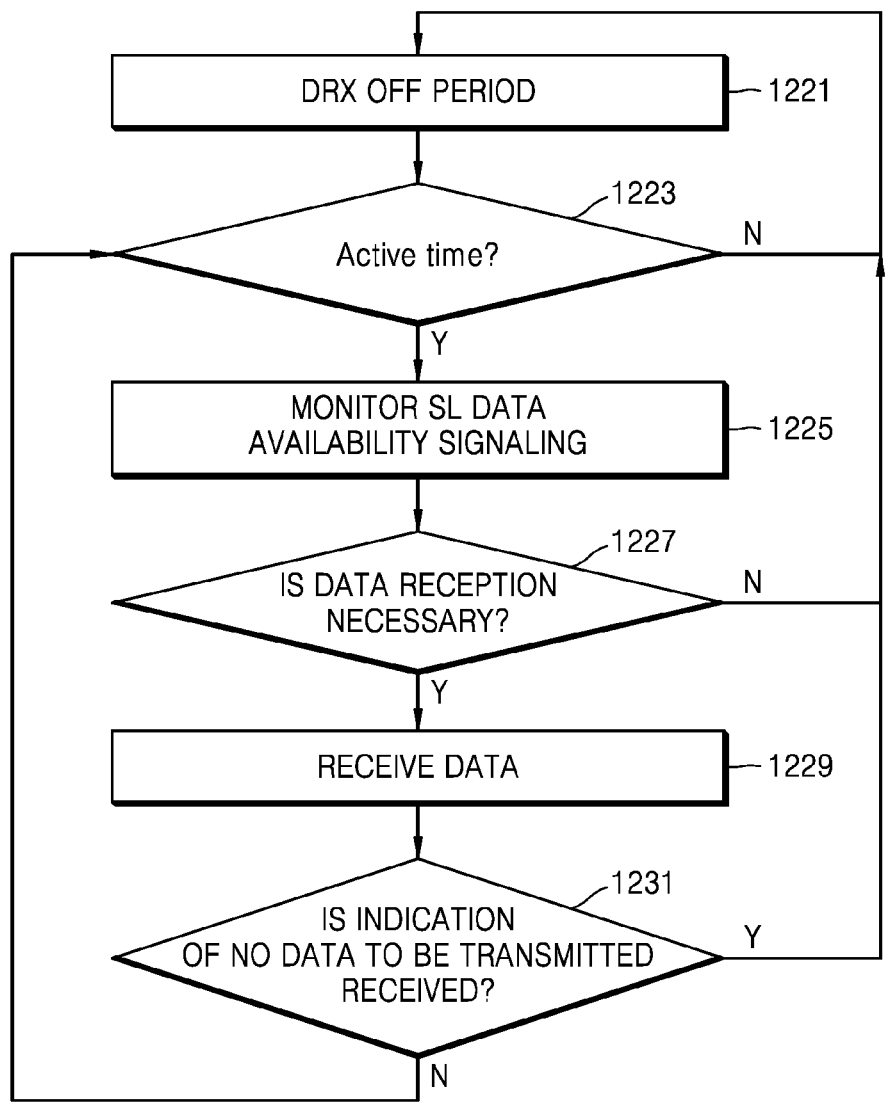
FIG. 12B is a diagram for explaining an operation by a terminal for processing sidelink DRX, according to an embodiment of the disclosure.

Referring to FIG. 12B, the terminal may perform a DRX off period operation, in operation 1221. The terminal may determine whether an active time is configured, in operation 1223. The active time of operation 1223 may be determined based on a SL DRX cycle corresponding to the terminal and an on-duration corresponding thereto.

When it is determined that it is not an active time, in operation 1223, the terminal may proceed to operation 1221. When it is determined that it is an active time, in operation 1223, the terminal may proceed to operation 1225 and monitor a SL data availability signaling. The SL data availability signaling monitoring operation by the reception terminal is to receive the signaling transmitted in operation 1107 in FIG. 11A, by the transmission terminal. The terminal may determine the necessity of data reception (or the necessity of monitoring the signaling transmitted by the transmission terminal), based on the SL data availability signaling, in operation 1227. When it is necessary to receive data (or to monitor the signaling transmitted by the transmission terminal), according to the determination of operation 1227, the terminal may proceed to operation 1229 and receive data (monitor the signaling transmitted by the transmission terminal) and proceed to operation 1231.

The terminal may determine whether signaling of no more data availability is received, in operation 1231. When it is determined that the signaling of no more data availability is received, according to the determination of operation 1231, the terminal may proceed to operation 1221. When it is not determined that the no more data availability is received, according to the determination of operation 1231, the terminal may proceed to operation 1223. The terminal proceeding to operation 1223 may determine whether the active time is valid. When it is determined that the active time is valid, according to the determination of operation 1223, the terminal may proceed to operation 1225. When it is determined that the active time is not valid, according to the determination of operation 1223, the terminal may proceed to operation 1221.

Figure 12C:
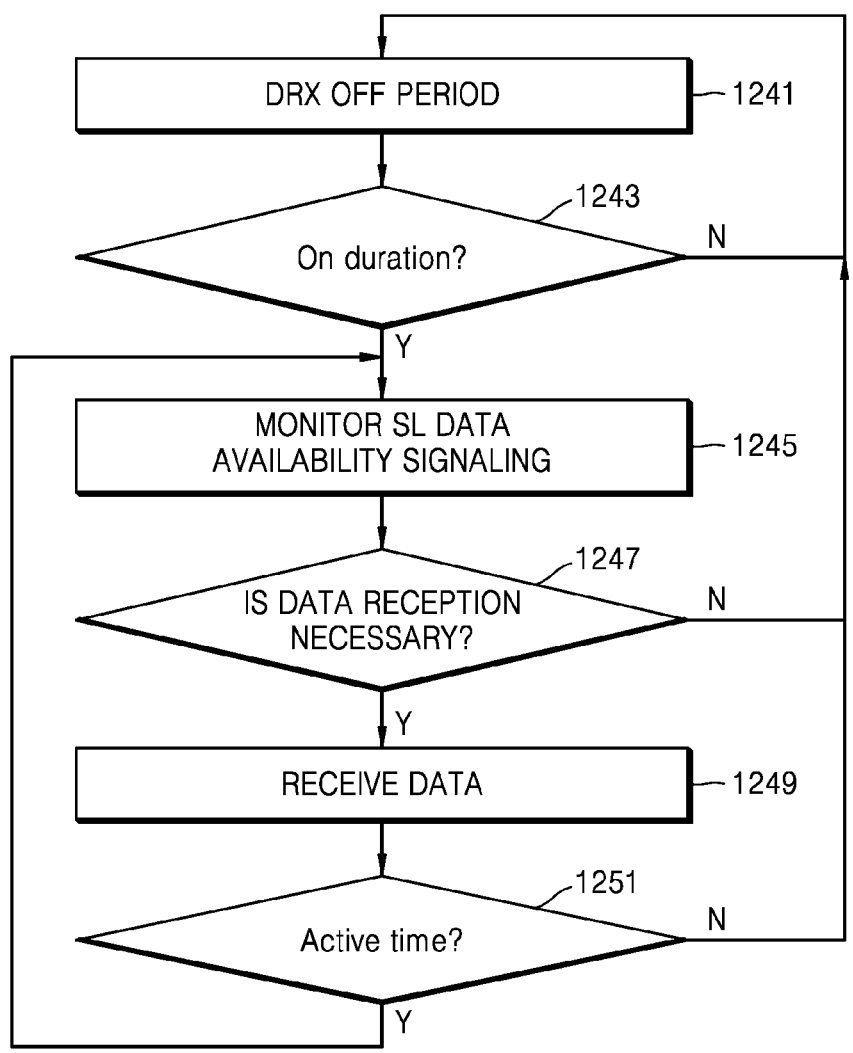
FIG. 12C is a diagram for explaining an operation by a terminal for processing sidelink DRX, according to an embodiment of the disclosure.

Referring to FIG. 12C, the terminal may perform a DRX off period operation, in operation 1241. The terminal may determine whether a period of a SL DRX cycle corresponding to the terminal is an on-duration period, in operation 1243. When it is determined that it is not the on-duration period, in operation 1243, the terminal may proceed to operation 1241. When it is determined that it is the on-duration period, in operation 1243, the terminal may proceed to operation 1245 and monitor a SL data availability signaling. The SL data availability signaling monitoring operation by the reception terminal is to receive the signaling transmitted in operation 1107 in FIG. 11A, by the transmission terminal.

The terminal may determine the necessity of data reception (or the necessity of monitoring the signaling transmitted by the transmission terminal), based on the SL data availability signaling, in operation 1247. When it is determined not necessary to receive data (or to monitor the signaling transmitted by the transmission terminal), according to the determination of operation 1247, the terminal may proceed to operation 1241. When it is necessary to receive data (or to monitor the signaling transmitted by the transmission terminal), according to the determination of operation 1247, the terminal may proceed to operation 1249 and receive data (monitor the signaling transmitted by the transmission terminal).

The terminal may determine whether an active time is valid, in operation 1251. When it is determined that the active time is valid, according to the determination of operation 1251, the terminal may proceed to operation 1245. When it is determined that the active time is not valid, according to the determination of operation 1251, the terminal may proceed to operation 1241.

Figure 12D:
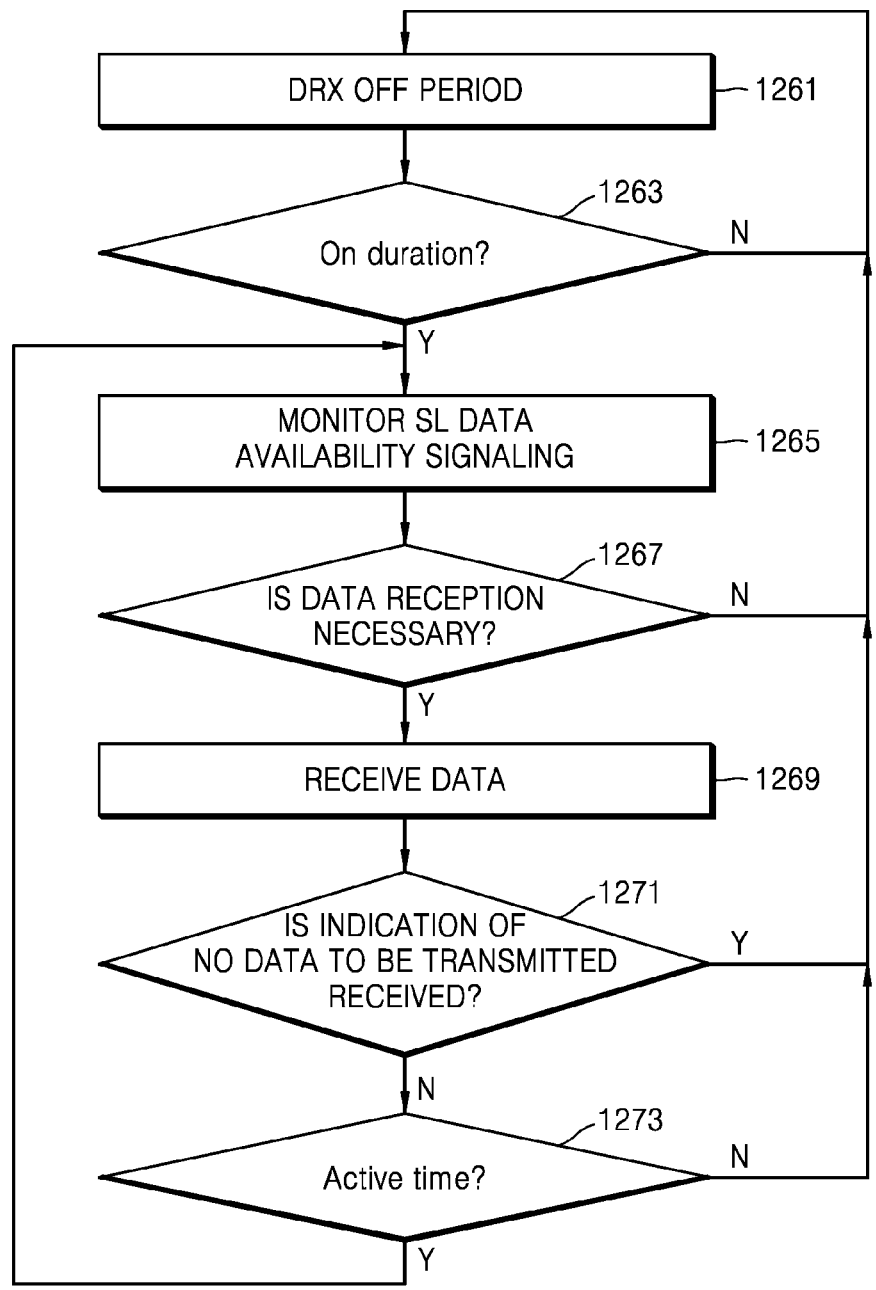
FIG. 12D is a diagram for explaining an operation by a terminal for processing sidelink DRX, according to an embodiment of the disclosure.

Referring to FIG. 12D, the terminal may perform a DRX off period operation, in operation 1261. The terminal may determine whether a period of a SL DRX cycle corresponding to the terminal is an on-duration period, in operation 1263. When it is determined that it is not the on-duration period, in operation 1263, the terminal may proceed to operation 1261. When it is determined that it is the on-duration period, in operation 1263, the terminal may proceed to operation 1265 and monitor a SL data availability signaling. The SL data availability signaling monitoring operation by the reception terminal is to receive the signaling transmitted in operation 1107 in FIG. 11A, by the transmission terminal.

The terminal may determine the necessity of data reception (or the necessity of monitoring the signaling transmitted by the transmission terminal), based on the SL data availability signaling, in operation 1267. When it is determined not necessary to receive data (or to monitor the signaling transmitted by the transmission terminal), according to the determination of operation 1267, the terminal may proceed to operation 1261. When it is necessary to receive data (or to monitor the signaling transmitted by the transmission terminal), according to the determination of operation 1267, the terminal may proceed to operation 1269 and receive data (monitor the signaling transmitted by the transmission terminal).

The terminal may determine whether signaling of no more data availability is received, in operation 1271. When it is determined that the signaling of no more data availability is received, according to the determination of operation 1271, the terminal may proceed to operation 1261. When it is not determined that the signaling of no more data availability is received, according to the determination of operation 1271, the terminal may proceed to operation 1273.

The terminal may determine whether an active time is valid, in operation 1273. When it is determined that the active time is valid, according to the determination of operation 1273, the terminal may proceed to operation 1265. When it is determined that the active time is not valid, according to the determination of operation 1273, the terminal may proceed to operation 1261.

Figure 12E:
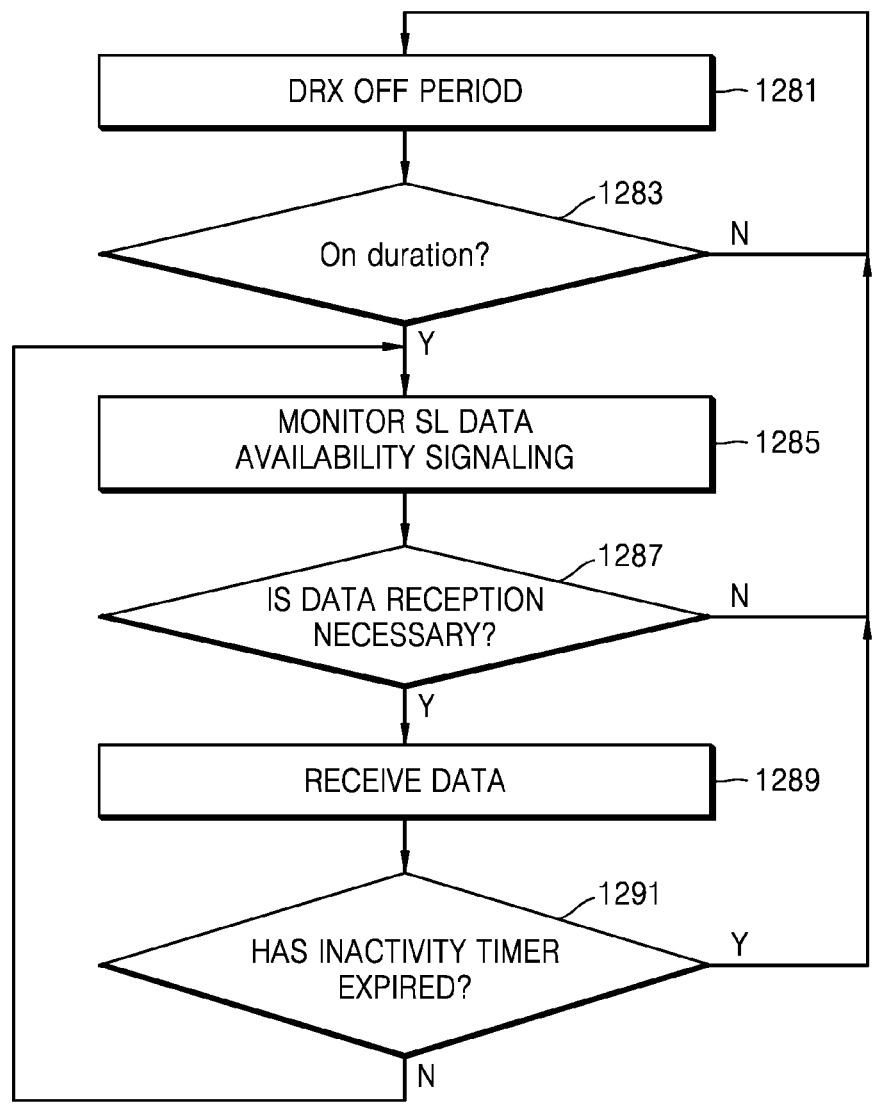
FIG. 12E is a diagram for explaining an operation by a terminal for processing sidelink DRX, according to an embodiment of the disclosure.

Referring to FIG. 12E, the terminal may perform a DRX off period operation, in operation 1281. The terminal may determine whether a period of a SL DRX cycle corresponding to the terminal is an on-duration period, in operation 1283. When it is determined that it is not the on-duration period, in operation 1283, the terminal may proceed to operation 1281. When it is determined that it is the on-duration period, in operation 1283, the terminal may proceed to operation 1285 and monitor a SL data availability signaling. The SL data availability signaling monitoring operation by the reception terminal is to receive the signaling transmitted in operation 1107 in FIG. 11A, by the transmission terminal.

The terminal may determine the necessity of data reception (or the necessity of monitoring the signaling transmitted by the transmission terminal), based on the SL data availability signaling, in operation 1287. When it is determined not necessary to receive data (or to monitor the signaling transmitted by the transmission terminal), according to the determination of operation 1287, the terminal may proceed to operation 1281. When it is necessary to receive data (or to monitor the signaling transmitted by the transmission terminal), according to the determination of operation 1287, the terminal may proceed to operation 1289 and receive data (monitor the signaling transmitted by the transmission terminal).

The terminal may determine whether an inactivity-timer has expired, in operation 1291. When it is determined that the inactivity-timer has expired, according to the determination of operation 1291, the terminal may proceed to operation 1281. When it is determined that the inactivity-timer has not expired, according to the determination of operation 1291, the terminal may proceed to operation 1285.

FIGS. 13A to 13D are diagrams for explaining an operation by a terminal for processing SL DRX, according to an embodiment of the disclosure. FIGS. 13A to 13D show an operation by a reception terminal for performing a SL DRX operation by receiving a SL data availability signaling transmitted by a BS based on a request from a transmission terminal.

The reception terminal may determine whether at least one of service information corresponding to the reception terminal, a destination ID of the service, a source ID of the service, a SL flow, a SL radio bearer, or a HARQ process ID is indicated in the SL data availability signaling received from the BS. When the same destination ID is mapped to different source IDs and used, the reception terminal may determine whether a mapping of a source ID to the destination ID corresponds to the reception terminal.

In the embodiment of FIGS. 13A to 13D, when an indication informing SL data availability transmitted by the BS is received, the terminal may determine to monitor a SL signaling transmitted by the transmission terminal. According to an embodiment of the disclosure, the SL signaling monitored by the reception terminal may include at least one of a SL data availability signaling transmitted by the transmission terminal, SCI corresponding to control information of data transmitted by the transmission terminal, or data transmitted by the transmission terminal.

In the embodiments of FIGS. 13A to 13D, an operation of monitoring a SL data availability signaling of the transmission terminal by the reception terminal is described as an example. The reception terminal may determine whether at least one of service information corresponding to the reception terminal, a destination ID of the service, a source ID of the service, a SL flow, a SL radio bearer, or a HARQ process ID is indicated in the received SL data availability signaling or the signaling transmitted by the transmission terminal. When the same destination ID is mapped to different source IDs and used, the reception terminal may determine whether a mapping of a source ID to the destination ID corresponds to the reception terminal.

In the configured SL DRX cycle, an operation of determining, by the reception terminal, whether to continuously monitor a SL signaling or to proceed to an DRX off period may include at least one or a combination of the following. In the DRX off period, it is not necessary that the reception terminal monitors a SL signaling.

(1) The terminal may monitor a BS signaling. When it is determined that the BS signaling indicates a no more SL data availability indication notification, the terminal may transition to a DRX off period. The reception terminal may process the SL signaling received from the transmission terminal and then may transition to the DRX off period.

(2) When it is determined that a no more SL data availability signaling is received through a SL channel from the transmission terminal, the terminal may transition to the DRX off period. The reception terminal may process the SL signaling received from the transmission terminal and then may transition to the DRX off period.

(3) When it is determined that an inactivity timer of the corresponding SL DRX configuration has expired, the terminal may transition to the DRX off period. The reception terminal may process the SL signaling received from the transmission terminal and then may transition to the DRX off period.

Figure 13A:
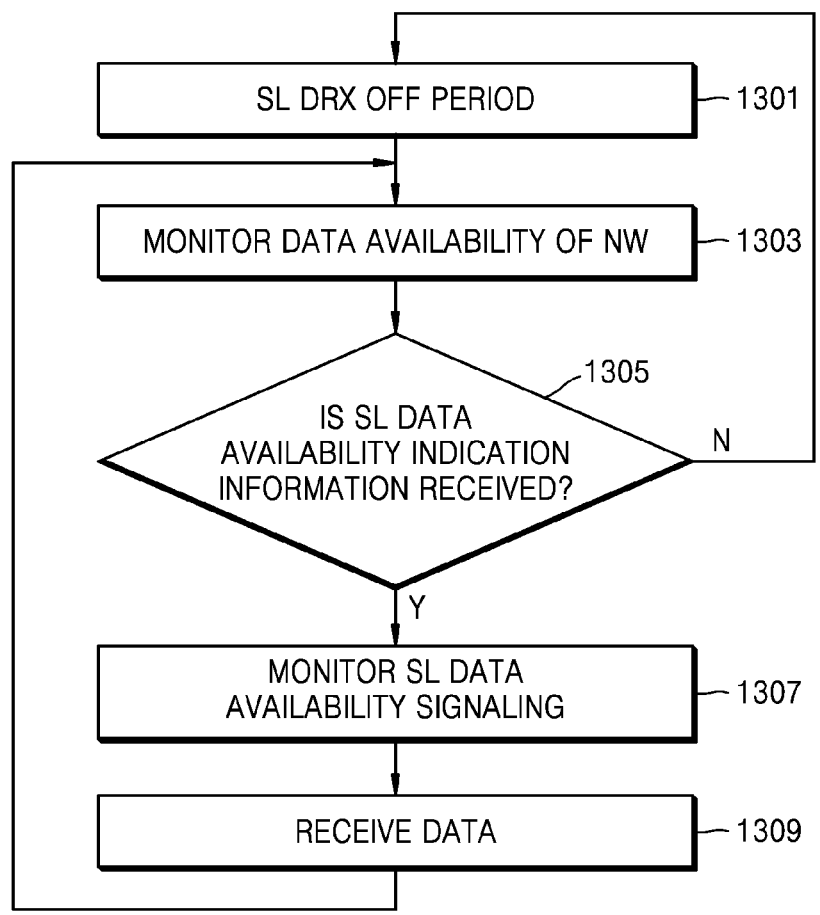
FIG. 13A is a diagram for explaining an operation by a terminal for processing sidelink DRX, according to an embodiment of the disclosure.

Referring to FIG. 13A, the terminal may perform a SL DRX off period operation, in operation 1301. The terminal may monitor a SL data availability signaling transmitted by a BS, in operation 1303. The signaling by the BS, of which the reception is monitored by the terminal in operation 1303, may include at least one of a system information message, a paging message, or an MBS broadcast message.

The SL data availability signaling transmitted by the BS may be transmitted based on the request from the transmission terminal in operation 1123 of FIG. 11B or operation 1143 of FIG. 11C. The terminal may determine whether a notification indicating SL data availability is received, in operation 1305.

When it is determined that the notification indicating the SL data availability is not received, according to the determination of operation 1305, the terminal may proceed to operation 1301. When it is determined that that the notification indicating the SL data availability is received, according to the determination of operation 1305, the terminal may monitor a SL data availability signaling, in operation 1307. An operation by the terminal for monitoring the SL data availability signaling in operation 1307 may be performed in a SL DRX cycle configured in the terminal and an on-duration corresponding to the SL DRX cycle.

The terminal may receive data transmitted by the transmission terminal based on the SL data availability signaling, in operation 1309. The terminal may proceed to operation 1303, and monitor a reception of a notification signaling until before transitioning to the SL DRX off period of the corresponding SL DRX cycle, the notification signaling indicating SL data availability transmitted by the BS. When the notification signaling indicating the SL data availability is received from the BS before transitioning to the DRX off period, the terminal may proceed to operation 1305.

In another embodiment of the disclosure, the terminal proceeding from operation 1309 to operation 1303 in FIG. 13A may proceed to the DRX off period when a no more SL data availability notification signaling is received from the BS.

Figure 13B:
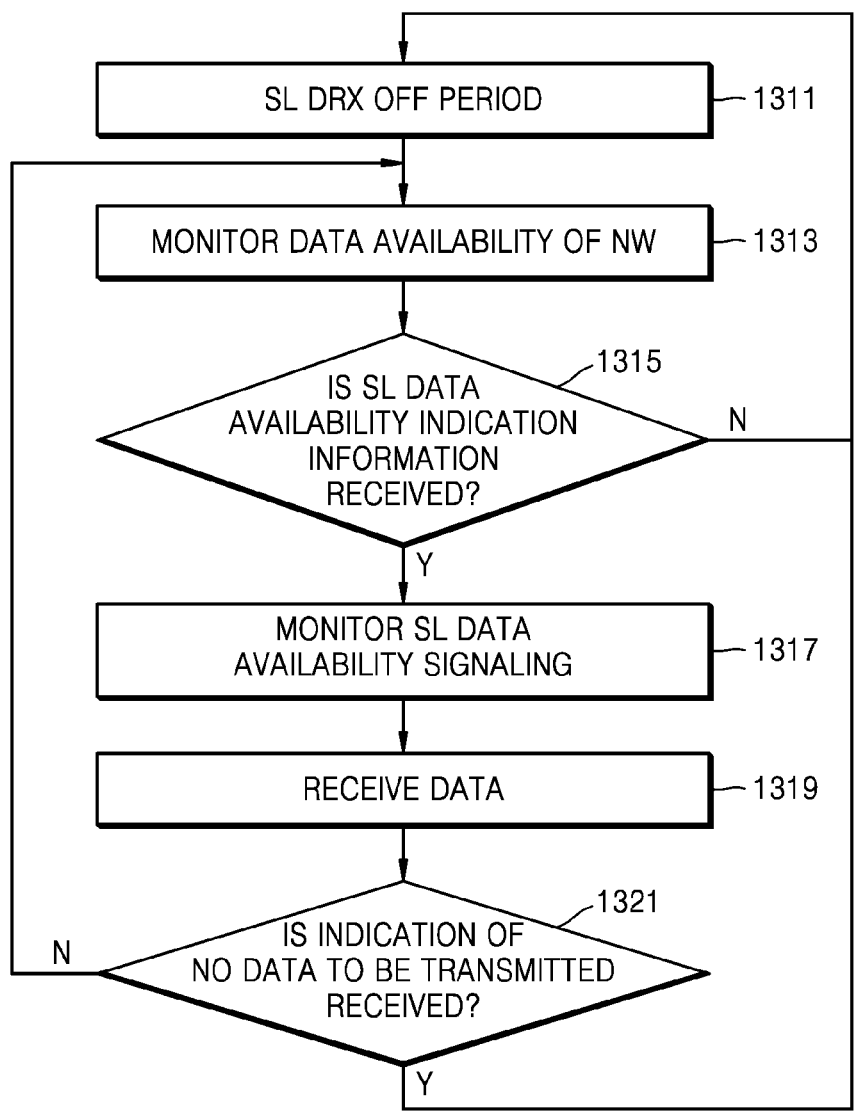
FIG. 13B is a diagram for explaining an operation by a terminal for processing sidelink DRX, according to an embodiment of the disclosure.

Referring to FIG. 13B, the terminal may perform a SL DRX off period operation, in operation 1311. The terminal may monitor a SL data availability signaling transmitted by the BS, in operation 1313. The signaling by the BS of which the reception is monitored by the terminal in operation 1313 may include at least one of a system information message, a paging message, or an MBS broadcast message.

The SL data availability signaling transmitted by the BS may be transmitted based on the request from the transmission terminal in operation 1123 of FIG. 11B or operation 1143 of FIG. 11C. The terminal may determine whether a notification indicating SL data availability is received, in operation 1315.

When it is determined that the notification indicating the SL data availability is not received, according to the determination of operation 1315, the terminal may proceed to operation 1311. When it is determined that the notification indicating the SL data availability is received, according to the determination of operation 1315, the terminal may monitor a SL data availability signaling, in operation 1317. An operation by the terminal for monitoring the SL data availability signaling in operation 1317 may be performed in a SL DRX cycle configured in the terminal and an on-duration corresponding to the SL DRX cycle.

The terminal may receive data transmitted by the transmission terminal based on the SL data availability signaling, in operation 1319. The terminal may determine whether a signaling indicating that there is no SL data to be transmitted is received, in operation 1321. When the signaling indicating that there is no SL data to be transmitted is received, according to the determination of operation 1321, the terminal may proceed to operation 1311. When the signaling indicating that there is no SL data to be transmitted is not received, according to the determination of operation 1321, the terminal may proceed to operation 1313.

In another embodiment of the disclosure, when proceeding from operation 1321 to operation 1313 of FIG. 13B, the terminal may monitor a notification signaling indicating SL data availability transmitted by the BS. In operation 1313, when a no more SL data availability notification signaling is received from the BS, the terminal may proceed to the DRX off period.

Figure 13C:
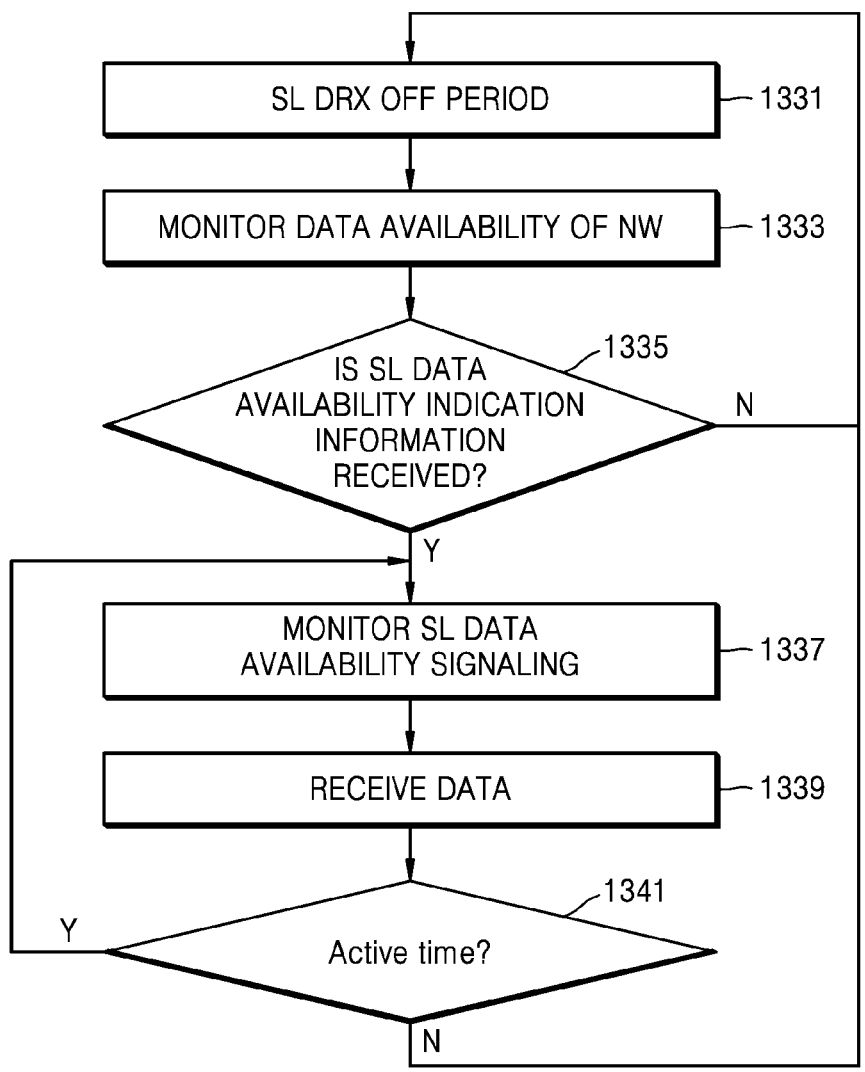
FIG. 13C is a diagram for explaining an operation by a terminal for processing sidelink DRX, according to an embodiment of the disclosure.

Referring to FIG. 13C, the terminal may perform a SL DRX off period operation, in operation 1331. The terminal may monitor a SL data availability signaling transmitted by the BS, in operation 1333. The signaling by the BS of which the reception is monitored by the terminal in operation 1333 may include at least one of a system information message, a paging message, or an MBS broadcast message. The SL data availability signaling transmitted by the BS may be transmitted based on the request from the transmission terminal in operation 1123 of FIG. 11B or operation 1143 of FIG. 11C.

The terminal may determine whether a notification indicating SL data availability is received, in operation 1335. When it is determined that the notification indicating the SL data availability is not received, according to the determination of operation 1335, the terminal may proceed to operation 1331. When it is determined that the notification indicating the SL data availability is received, according to the determination of operation 1335, the terminal may monitor a SL data availability signaling, in operation 1337.

An operation of monitoring the SL data availability signaling in operation 1337, by the terminal may be performed in a SL DRX cycle configured in the terminal and an on-duration corresponding to the SL DRX cycle. The terminal may receive data transmitted by the transmission terminal based on the SL data availability signaling, in operation 1339. The terminal may determine whether an active time is configured, in operation 1341. When it is determined that it is an active time, according to the determination of operation 1341, the terminal may proceed to operation 1337. When it is determined that it is not an active time, according to the determination of operation 1341, the terminal may proceed to operation 1331.

According to another embodiment of the disclosure, when transitioning from operation 1341 to operation 1337 of FIG. 13C and a no more SL data availability signaling is received while the SL data availability signaling is monitored, the terminal may transition to the DRX off period.

Figure 13D:
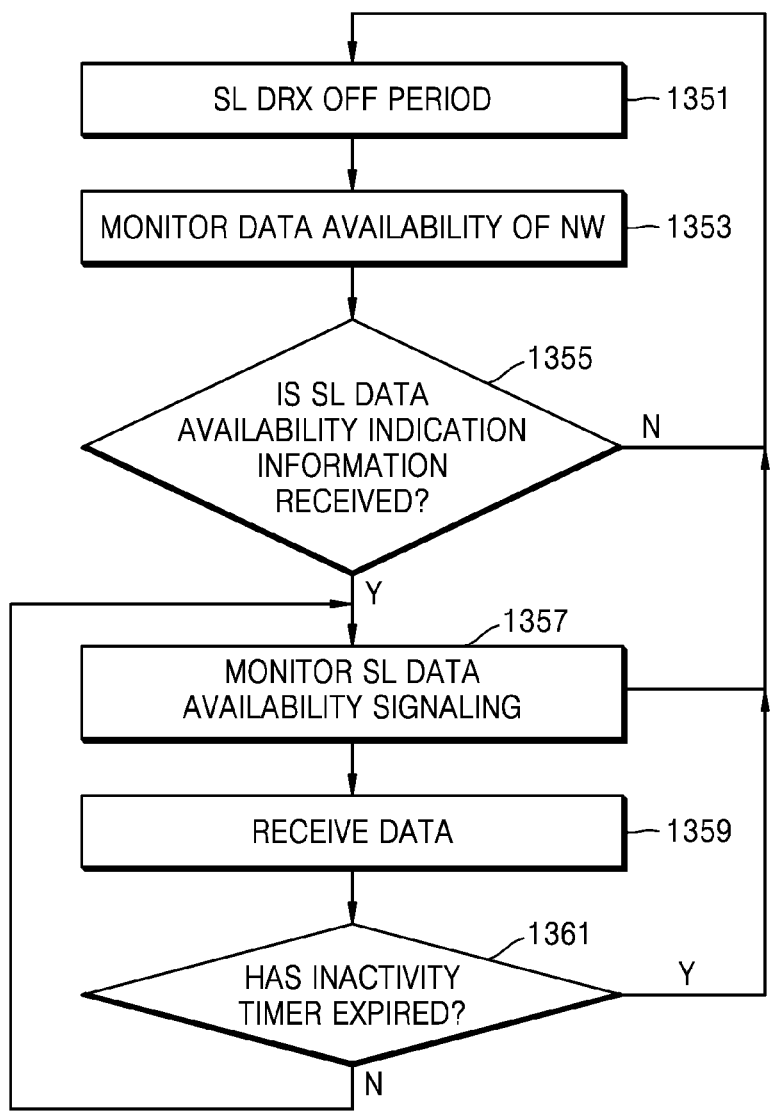
FIG. 13D is a diagram for explaining an operation by a terminal for processing sidelink DRX, according to an embodiment of the disclosure.

Referring to FIG. 13D, the terminal may perform a SL DRX off period operation, in operation 1351. The terminal may monitor a SL data availability signaling transmitted by the BS, in operation 1353. The signaling by the BS of which the reception is monitored by the terminal in operation 1353 may include at least one of a system information message, a paging message, or an MBS broadcast message.

The SL data availability signaling transmitted by the BS may be transmitted based on the request from the transmission terminal in operation 1123 of FIG. 11B or operation 1143 of FIG. 11C. The terminal may determine whether a notification indicating SL data availability is received, in operation 1355. When it is determined that the notification indicating the SL data availability is not received, according to the determination of operation 1355, the terminal may proceed to operation 1351. When it is determined that the notification indicating the SL data availability is received, according to the determination of operation 1355, the terminal may monitor a SL data availability signaling, in operation 1357.

An operation of monitoring the SL data availability signaling in operation 1357, by the terminal may be performed in a SL DRX cycle configured in the terminal and an on-duration corresponding thereto. The terminal may receive data transmitted by the transmission terminal based on the SL data availability signaling, in operation 1359. The terminal may determine whether an inactivity-timer of the corresponding SL DRX configuration has expired, in operation 1361.

When it is determined that the inactivity-timer has expired, according to the determination of operation 1361, the terminal may proceed to operation 1351. When it is determined that the inactivity-timer has not expired, according to the determination of operation 1361, the terminal may proceed to operation 1357.

According to another embodiment of the disclosure, when transitioning from operation 1361 to operation 1357 of FIG. 13D and a no more SL data availability signaling is received while the SL data availability signaling is monitored, the terminal may transition to the DRX off period.

According to an embodiment of the disclosure, a SL transmission resource pool and a SL reception resource pool may be configured to be aligned, so as to efficiently operate a SL DRX operation between a transmission terminal and a reception terminal. The SL transmission resource pool and the SL reception resource pool may be aligned to be mapped to one or more SL DRX configurations.

According to an embodiment of the disclosure, a SL resource pool may include at least one or a combination of a transmission pool or a reception pool. The SL resource pool may include at least one or a combination of a common pool used in RRC_IDLE and RRC_INACTIVE by a terminal, a dedicated pool used in RRC_CONNECTED by the terminal, or an exceptional pool used by the terminal when a handover to a target cell, a transition to an RRC state, or a sensing-based resource cannot be obtained.

According to an embodiment of the disclosure, a SL DRX configuration may be configured with a combination of one or more DRX cycles and one or more on-durations. The SL DRX configuration, i.e., the DRX cycle or on-duration, may be configured based on a SL QoS parameter set, a SL PQI, and a SL traffic pattern (periodical, aperiodical, or bursty). When SL configured grant type 1 or SL configured grant type 2 is configured based on the SL traffic pattern, the BS may configure the terminal with one or more SL DRX configurations that may be mapped to a SL configured grant.

According to an embodiment of the disclosure, when the terminal configures one or more unicast connections, the terminal may transmit, to the counterpart terminal of the unicast connection, SL configured grant configuration information and one or more pieces of SL DRX configuration information mapped thereto. When the terminal configures one or more unicast connections with the counterpart terminal or configures one or more logical channels with respect to a unicast connection, the terminal may transmit SL configured grant configuration information to be applied to each unicast connection and SL DRX configuration information mapped thereto, or may transmit SL configured grant configuration information to be applied to each of the logical channels and SL DRX configuration information mapped thereto, to the counterpart terminal.

According to an embodiment of the disclosure, when the terminal directly schedules a transmission resource, the terminal may configure a resource reservation period based on a periodic pattern of traffic. In addition, when it is determined that the resource reservation period and the SL DRX configuration may be mapped with respect to one or more unicast connections, the terminal may transmit, to the counterpart terminal of the corresponding unicast connection, at least one piece of information from among a unicast connection identifier, a SL radio bearer (SLRB) identifier, a logical channel identifier, a resource reservation period configuration information, or SL DRX configuration information.

According to an embodiment of the disclosure, based on a mapping configuration of a SL resource pool and one or more SL DRX configurations, a transmission terminal or a reception terminal may determine to which transmission resource pool or reception resource pool the one or more SL DRX configurations are to be applied.

According to an embodiment of the disclosure, the SL DRX configuration may be mapped to at least one of a SL QoS parameter set, a SL PQI, or a SL cast type.

According to an embodiment of the disclosure, the cast type may include broadcast, groupcast, and unicast, and is not limited to the example above. The SL resource pool may be mapped to at least one of a SL QoS parameter set, a SL PQI (PC5 QoS Identifier), or a SL cast type. For example, the SL PQI may be configured with respect to one or more SL DRX configurations. In addition, the SL QoS parameter set may be configured with respect to one or more SL DRX configurations. The SL cast type may be configured with respect to one or more SL DRX configurations.

The SL resource pool may be configured with respect to one or more PQIs. The SL resource pool may be configured with respect to one or more QoS parameter sets. The SL resource pool may be configured with respect to one or more cast types. The SL resource pool may be configured with respect to one or more SL DRX configurations.

The transmission terminal or the reception terminal may determine configuration information of at least one or a combination of a SL resource pool, a SL DRX configuration, a SL QoS parameter set, a SL PQI, or a SL cast type, corresponding to the SL resource pool. The transmission terminal or the reception terminal may determine configuration information of at least one or a combination of a SL DRX configuration, a SL QoS parameter set, a SL PQI, or a SL cast type, corresponding to the SL DRX configuration.

For example, the transmission terminal may determine a SL resource pool, a SL PQI (or a SL QoS parameter set) corresponding thereto, a SL DRX configuration, and a SL PQI (or a SL QoS parameter set) corresponding thereto, and the transmission terminal may determine a SL DRX cycle, a SL DRX offset, a SL on-duration, a period in which a SL data availability signaling is transmitted, or a SL inactivity-timer, in a case in which data of a SL flow corresponding to the SL PQI (or SL QoS parameter set) is transmitted by using the SL resource pool.

The reception terminal may determine a SL resource pool, a SL PQI (or SL QoS parameter set) corresponding thereto, a SL DRX configuration, and a SL PQI (or SL QoS parameter set) corresponding thereto. The reception terminal may determine a SL DRX cycle, a SL DRX offset, a SL on-duration, a period in which SL data availability signaling is monitored, or a SL inactivity-timer, in a case in which data of a SL flow corresponding to a SL PQI (or a SL QoS parameter set) is received by using the SL resource pool.

The transmission terminal may determine a SL resource pool, a SL PQI (or SL QoS parameter set) corresponding thereto, a SL DRX configuration, and a SL cast type corresponding thereto. The transmission terminal may determine a SL cast type, a SL DRX cycle, a SL DRX offset, a SL on-duration, a period in which SL data availability signaling is transmitted, or a SL inactivity-timer, in a case in which data of a SL flow corresponding to a SL PQI (or SL QoS parameter set) is transmitted by using the SL resource pool.

The reception terminal may determine a SL resource pool, a SL PQI (or SL QoS parameter set) corresponding thereto, a SL DRX configuration, and a SL cast type corresponding thereto. The reception terminal may determine a SL cast type, a SL DRX cycle, a SL DRX offset, a SL on-duration, a period in which SL data availability signaling is monitored, or a SL inactivity-timer, in a case in which data of a SL flow corresponding to a SL PQI (or SL QoS parameter set) is received by using the SL resource pool.

In addition, the transmission terminal may determine a SL resource pool and SL DRX configuration information corresponding thereto. The transmission terminal may determine a SL DRX cycle, a SL DRX offset, a SL on-duration, a period in which a SL data availability signaling is transmitted, or a SL inactivity-timer, in a case in which a SL resource pool is used.

The reception terminal may determine a SL resource pool and SL DRX configuration information corresponding thereto. The reception terminal may determine a SL DRX cycle, a SL DRX offset, a SL on-duration, a period in which a SL data availability signaling is monitored, or a SL inactivity-timer, in a case in which a SL resource pool is used.

In addition, the transmission terminal may determine a SL resource pool, a SL DRX configuration, and a SL cast type corresponding thereto. The transmission terminal may determine a SL cast type, a SL DRX cycle, a SL DRX offset, a SL on-duration, a period in which a SL data availability signaling is transmitted, or a SL inactivity-timer, in a case in which a SL resource pool is used.

The reception terminal may determine a SL resource pool, a SL DRX configuration, and a SL cast type corresponding thereto. The reception terminal may determine a SL cast type, a SL DRX cycle, a SL DRX offset, a SL on-duration, a period in which a SL data availability signaling is monitored, or a SL inactivity-timer, in a case in which a SL resource pool is used.

Mapping information of at least one or a combination of a SL DRX configuration, a SL resource pool, a SL PQI, or a SL QoS parameter set may be obtained according to at least one method from among a signaling between the terminal and the BS, information pre-configured in the terminal, or a signaling between terminals (SL unicast).

For example, a BS may configure a SL DRX configuration and one or more PQI configurations mapped thereto and transmit the configured SL DRX configuration and one or more PQI configurations mapped thereto, to the terminal. In addition, the terminal may transmit the obtained SL DRX configuration and the one or more PQI configuration information mapped thereto, to the counterpart terminal through a unicast signaling. In addition, the BS may also configure a SL DRX configuration and one or more SLRB configurations mapped thereto and transmit the configured SL DRX configuration and one or more SLRB configurations mapped thereto, to the terminal. In addition, the terminal may transmit the obtained SL DRX configuration and the one or more SLRB configuration information mapped thereto, to the counterpart terminal through a unicast signaling. In addition, the terminal may determine a SL DRX configuration, one or more resource pools mapped thereto, a cast type, a PQI, and a QoS parameter set, without an additional signaling. In addition, when the BS determines a SL DRX configuration and transfers the determined SL DRX configuration to the terminal, the terminal may transmit, to the BS, at least one or a combination of preferred DRX configuration information or SL traffic pattern information. In addition, the terminal may obtain, from the BS or pre-configured information, SL DRX configuration information (information such as SL DRX configuration and a resource pool mapped thereto, a unicast connection, a groupcast connection, a broadcast connection, an SLRB, a PQI, a QoS parameter set, a logical channel, or the like) and determine a SL DRX configuration to be directly applied by the terminal, based on SL connection information (information such as a unicast connection, a groupcast connection, a broadcast connection, an SLRB, a PQI, a QoS parameter set, a logical channel, or the like).

According to an embodiment of the disclosure, with respect to a SL unicast connection of the terminal, the BS may configure a SL resource pool to be used when data of the corresponding unicast connection is transmitted and received. Configuration information for configuring a SL resource pool may include mapping information of a resource pool to be used in SL DRX (pool index or pool configuration information with respect to a transmission pool, a reception pool, or a combination thereof) and at least one of a unicast link identifier, a destination identifier, or a source identifier. In addition, the configuration information for configuring the SL resource pool may include mapping information of a resource pool (a pool index or pool configuration information with respect to a transmission pool, a reception pool, or a combination thereof) and at least one of a destination identifier, a SLRB identifier, or a logical channel identifier, of the unicast connection. According to an embodiment of the disclosure, a transmission terminal or a reception terminal may determine which transmission resource pool or reception resource pool is to be used when SL DRX is configured for the corresponding unicast connection, based on the configuration information obtained from the BS.

According to an embodiment of the disclosure, when one or more transmission resource pools are obtained based on the resource pool configuration information obtained from the BS, the transmission terminal may perform a transmission resource pool selection operation for selecting which transmission resource pool is to be used for a unicast connection for which SL DRX is configured. The transmission resource pool selection may be performed based on whether the corresponding pool includes a HARQ feedback resource and based on whether a HARQ feedback of a logical channel belonging to the corresponding unicast connection is configured. (For example, the transmission terminal may select a pool including a HARQ feedback resource when a HARQ feedback is configured for the logical channel belonging to the unicast connection, and may select a pool including the HARQ feedback resource or a pool not including the HARQ feedback resource, when the HARQ feedback is not configured for the logical channel belonging to the unicast connection.) The transmission resource pool selection may also be performed based on frequency information of the corresponding pool and a service frequency configured for the corresponding unicast connection.

According to an embodiment of the disclosure, the transmission terminal may transmit SL resource pool information to the reception terminal with respect to the unicast connection for which the SL DRX is configured, based on the resource pool configuration information obtained from the BS. The unicast connection may be indicated by at least one of a unicast link identifier, a destination identifier, a logical channel identifier, or an SLRB identifier, and the SL resource pool may be indicated by a pool index or pool configuration information. When an operation of selecting a pool to be used for a unicast connection from among one or more transmission resource pools is performed, the transmission terminal may transmit an index or configuration information of the selected pool to the reception terminal.

When SL DRX is configured, the reception terminal may determine which reception resource pool is monitored to perform a data monitoring in SL DRX for a unicast connection, based on SL resource pool information with respect to the corresponding unicast connection obtained from the BS or transmission terminal. When the SL resource pool is operated in one or more frequency bands, the reception terminal may obtain, from the BS or transmission terminal, mapping information of a unicast connection and a frequency band.

According to an embodiment of the disclosure, when one or more transmission resource pools are obtained based on the resource pool configuration information obtained from the BS, the transmission terminal may perform a transmission resource pool selection operation regarding which transmission resource pool is to be used for a groupcast connection for which SL DRX is configured. The transmission resource pool selection may be performed based on whether the corresponding pool includes a HARQ feedback resource and based on whether a HARQ feedback of a logical channel belonging to the corresponding groupcast connection is configured. (For example, the transmission terminal may select a pool including a HARQ feedback resource when a HARQ feedback is configured for the logical channel belonging to the groupcast connection, and may not select either a pool including the HARQ feedback resource or a pool not including the HARQ feedback resource, when the HARQ feedback is not configured for the logical channel belonging to the groupcast connection.) The transmission resource pool selection may also be performed based on frequency information of the corresponding pool and a service frequency configured for the corresponding groupcast connection.

According to an embodiment of the disclosure, when one or more transmission resource pools are obtained based on the resource pool configuration information obtained from the BS, the transmission terminal may perform a transmission resource pool selection operation regarding which transmission resource pool is to be used for a broadcast connection for which SL DRX is configured. The transmission resource pool selection may also be performed based on frequency information of the corresponding pool and a service frequency configured for the corresponding broadcast connection.

Figure 14A:
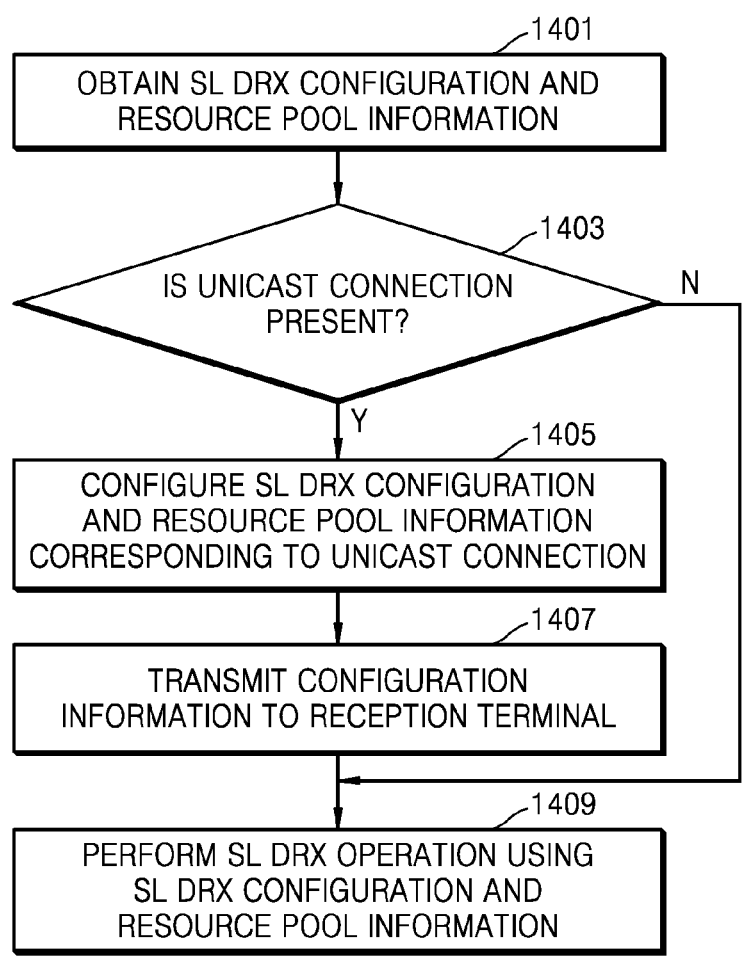
FIG. 14A is a diagram for explaining an operation by a transmission terminal for processing sidelink DRX, according to an embodiment of the disclosure.

FIG. 14A is a diagram for explaining an operation by a transmission terminal for processing SL DRX, according to an embodiment of the disclosure.

Referring to FIG. 14A, the terminal may obtain at least one or a combination of a SL DRX configuration and resource pool information mapped thereto, or SL configured grant information, in operation 1401. The at least one or the combination of the SL DRX configuration and the resource pool information mapped thereto, or the SL configured grant information may be obtained from a signaling transmitted by the BS or a pre-configured pre-configuration. When the terminal directly schedules a SL resource, resource reservation period configuration information may be obtained. In operation 1403, the terminal may determine whether there is at least one unicast connection to which the SL DRX configuration, the resource pool information, the SL configured grant information, and the resource reservation period configuration information are to be applied. When it is determined that the at least one unicast connection is configured, the terminal may generate configuration information applicable to the corresponding unicast connection, in operation 1405, wherein the configuration information includes at least one of the SL DRX configuration, the resource pool information, the SL configured grant information, or the resource reservation period configuration information. In another embodiment of the disclosure, when there is one or more resource pools, the terminal may perform an operation of selecting a resource pool to be used for the corresponding unicast connection and generate configuration information, so as to determine resource pool information applicable to the corresponding unicast connection, in operation 1405.

In operation 1407, the terminal may transmit the configuration information of operation 1405 to the reception terminal of the corresponding unicast connection. In operation 1409, the terminal may perform a SL DRX operation by applying the at least one or the combination of the SL DRX configuration, the resource pool information, the SL configured grant information, or the resource reservation period configuration information obtained in operation 1401 to the corresponding SL unicast connection, groupcast connection, and broadcast connection.

A transmission terminal performing a SL DRX operation according to various embodiments of the disclosure may operate an active time according to a SL DRX configuration corresponding to one or more unicast connections, groupcast connections, and broadcast connections. When the terminal has SL configured grant configuration information and SL DRX configuration information mapped thereto, a configured grant (CG) allocation of the SL configured grant may be operated as an active time of the corresponding SL DRX configuration. When the terminal directly schedules a transmission resource and a resource reservation period is configured based on a periodic pattern of traffic, the corresponding resource reservation period may be operated as an active time of the corresponding SL DRX configuration. Here, the active time may correspond to a time in which an on-duration timer is running, an inactivity timer is running, and a HARQ time is running.

Figure 14B:
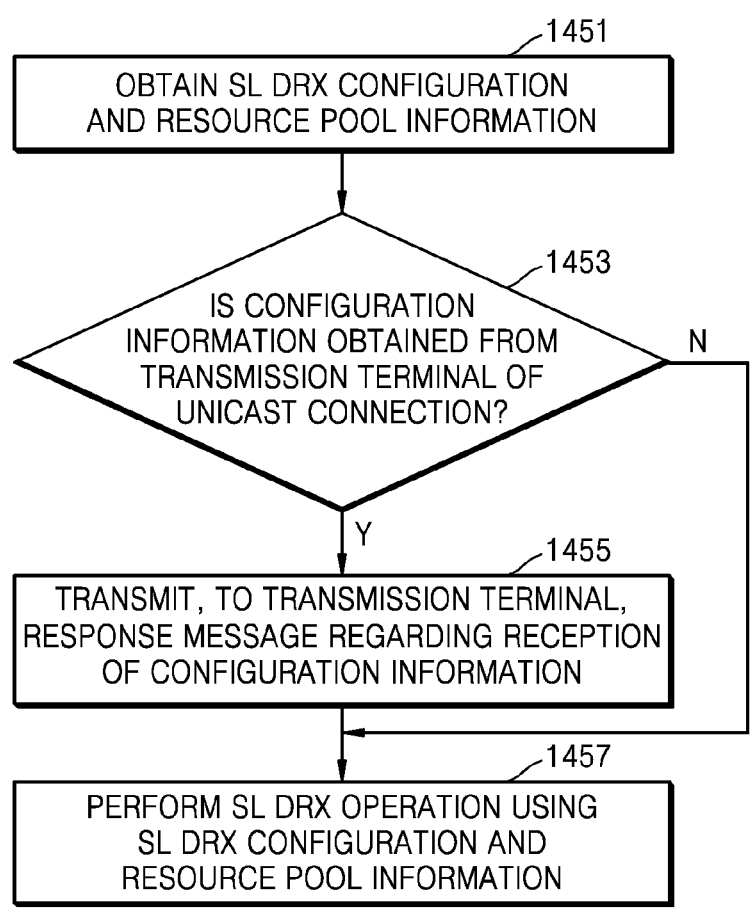
FIG. 14B is a diagram for explaining an operation by a reception terminal for processing sidelink DRX, according to an embodiment of the disclosure.

FIG. 14B is a diagram for explaining an operation of a reception terminal that processes SL DRX, according to an embodiment of the disclosure.

Referring to FIG. 14B, the terminal may obtain at least one or a combination of a SL DRX configuration and resource pool information mapped thereto, SL configured grant information, or resource reservation period configuration information, in operation 1451. The at least one or the combination of the SL DRX configuration and the resource pool information mapped thereto, the SL configured grant information, or the resource reservation period configuration information may be obtained from a signaling transmitted by the BS, pre-configured pre-configuration, or the counterpart terminal (e.g., the transmission terminal) of a unicast connection. In operation 1453, the terminal may determine whether the at least one or the combination of the SL DRX configuration, the resource pool information, the SL configured grant information, or the resource reservation period configuration information is obtained from the transmission terminal of the unicast connection. When it is determined that the at least one or the combination of the SL DRX configuration, the resource pool information, the SL configured grant information, or the resource reservation period configuration information is obtained from the counterpart terminal of the unicast connection, the terminal may transmit, to the counterpart terminal, a response message to the reception of the configuration information, in operation 1455. In operation 1457, the terminal may perform a SL DRX operation by applying the at least one or the combination of the SL DRX configuration, the resource pool information, the SL configured grant information, or the resource reservation period configuration information obtained in operation 1451 to the corresponding SL unicast connection, groupcast connection, and broadcast connection.

The methods according to embodiments as described in the specification or in the following claims of the disclosure may be implemented as hardware, software, or a combination of hardware and software.

When the electrical structures and methods are implemented in software, a computer-readable recording medium having one or more programs (software modules) recorded thereon may be provided. One or more programs stored in the computer-readable storage medium are configured to be executable by one or more processors in an electronic device. The one or more programs include instructions for causing the electronic device to execute the methods according to the embodiments of the disclosure described in the claims or the specification.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory including a combination of some or all of the above-mentioned memory devices. Also, each constituent memory may include a plurality of memories.

Also, the programs may be stored in an attachable storage device which is accessible via a communication network such as the Internet, an intranet, a local area network (LAN), a wireless LAN (WLAN), or a storage area network (SAN), or a combination thereof. Such a storage device may access, via an external port, a device performing the embodiments of the disclosure. Furthermore, a separate storage device on the communication network may access the electronic device performing the embodiments of the disclosure.

In the afore-described embodiments of the disclosure, elements included in the disclosure are expressed in a singular or plural form according to the embodiments of the disclosure. However, the singular or plural form is appropriately selected for convenience of descriptions and the disclosure is not limited thereto. As such, an element expressed in a plural form may also be configured as a single element, and an element expressed in a singular form may also be configured as plural elements.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

The invention claimed is:

1. A method performed by a first user equipment (UE) in a wireless communication system, the method comprising:
   transmitting, to a base station (BS), sidelink UE information including information on a sidelink flow, a PC5 quality of service (QOS) identifier (PQI) for the sidelink flow, information on a frequency on which the first UE is interested to receive sidelink communication, and a destination identity associated with a service in which the first UE is interested, wherein the service is associated with a sidelink discontinuous reception (DRX);
   receiving, from the BS, a radio resource control (RRC) message including configuration information on the sidelink DRX for groupcast or broadcast communication, wherein the configuration information on the sidelink DRX includes information about an on-duration, information about an inactivity timer, information about a DRX cycle, and information about QoS parameter; and
   receiving, from a second UE, sidelink data based on the configuration information on the sidelink DRX.

2. The method of claim 1,
   wherein the configuration information on the sidelink DRX further includes information about a retransmission timer.

3. The method of claim 1, further comprising:
   transmitting, to a BS, UE capability information including information indicating support of DRX on the sidelink, wherein a PC5-S message is received based on the configuration information on the sidelink DRX, the PC5-S message being used for establishing a unicast link.

4. A method performed by a second user equipment (UE) in a wireless communication system, the method comprising:
   transmitting, to a base station (BS), sidelink UE information including information on a sidelink flow, a PC5 quality of service (QOS) identifier (PQI) for the sidelink flow, information on a frequency on which a first UE is interested to receive sidelink communication, and a destination identity associated with a service in which the second UE is interested, wherein the service is associated with a sidelink discontinuous reception (DRX);
   receiving, from the BS, a radio resource control (RRC) message including configuration information on the sidelink DRX for groupcast or broadcast communication, wherein the configuration information on the sidelink DRX includes information about an on-duration, information about an inactivity timer, information about a DRX cycle, and information about QOS parameter; and
   transmitting, to a first UE, sidelink data based on the configuration information on the sidelink DRX.

5. The method of claim 4,
   wherein the configuration information on the sidelink DRX further includes information about a retransmission timer.

6. The method of claim 4, further comprising:
   transmitting, to a BS, UE capability information including information indicating support of DRX on the sidelink,
   wherein a PC5-S message is received based on the configuration information on the sidelink DRX, the PC5-S message being used for establishing a unicast link.

7. A first user equipment (UE) performed in a wireless communication system, the first UE comprising:
   a transceiver; and
   at least one processor coupled to the transceiver and configured to:
   transmit, to a base station (BS), sidelink UE information including information on a sidelink flow, a PC5 quality of service (QOS) identifier (PQI) for the sidelink flow, information on a frequency on which the first UE is interested to receive sidelink communication, and a destination identity associated with a service in which the first UE is interested, wherein the service is associated with a sidelink discontinuous reception (DRX),
   receive, from the BS, a radio resource control (RRC) message including configuration information on the sidelink DRX for groupcast or broadcast communication, wherein the configuration information on the sidelink DRX includes information about an on-duration, information about an inactivity timer, information about a DRX cycle, and information about QoS parameter, and
   receive, from a second UE, sidelink data based on the configuration information on the sidelink DRX.

8. The first UE of claim 7,
   wherein the configuration information on the sidelink DRX further includes information about a retransmission timer.

9. The first UE of claim 7, wherein the at least one processor is further configured to:

transmit, to a BS, UE capability information including information indicating support of DRX on the sidelink, wherein a PC5-S message is received based on the configuration information on the sidelink DRX, the PC5-S message being used for establishing a unicast link.

10. A second user equipment (UE) performed in a wireless communication system, the second UE comprising:

a transceiver; and at least one processor coupled to the transceiver and configured to:

transmit, to a base station (BS), sidelink UE information including information on a sidelink flow, a PC5 quality of service (QOS) identifier (PQI) for the sidelink flow information on a frequency on which a first UE is interested to receive sidelink communication, and a destination identity associated with a service in which the second UE is interested, wherein the service is associated with a sidelink discontinuous reception (DRX), receive, from the BS, a radio resource control (RRC) message including configuration information on the sidelink DRX for groupcast or broadcast communication, wherein the configuration information on the sidelink DRX includes information about an on-duration, information about an inactivity timer, information about a DRX cycle and information about QoS parameter, and transmit, to a first UE, sidelink data based on the configuration information on the sidelink DRX.

11. The second UE of claim 10, wherein the configuration information on the sidelink DRX further includes information about a retransmission timer.

12. The second UE of claim 10, wherein the at least one processor is further configured to:

transmit, to a BS, UE capability information including information indicating support of DRX on the sidelink, wherein a PC5-S message is received based on the sidelink DRX configuration information on the sidelink DRX, the PC5-S message being used for establishing a unicast link.

* * * * *